(12) United States Patent
With Møller et al.

(10) Patent No.: US 11,813,778 B2
(45) Date of Patent: Nov. 14, 2023

(54) CLAMPING TONG FOR A WIND TURBINE BLADE SHELL MOULD

(71) Applicant: LM WIND POWER US TECHNOLOGY APS, Kolding (DK)

(72) Inventors: Jesper With Møller, Kolding (DK);
Ivan Kaab Mosegaard, Kolding (DK);
Ib René Carlsen, Assens (DK)

(73) Assignee: LM WIND POWER INTERNATIONAL TECHNOLOGY II APS, Kolding (DK)

(*) Notice: Subject to any disclaimer, the term of this patent is extended or adjusted under 35 U.S.C. 154(b) by 404 days.

(21) Appl. No.: 16/630,204

(22) PCT Filed: Jul. 11, 2018

(86) PCT No.: PCT/EP2018/068759
§ 371 (c)(1),
(2) Date: Jan. 10, 2020

(87) PCT Pub. No.: WO2019/011970
PCT Pub. Date: Jan. 17, 2019

(65) Prior Publication Data
US 2020/0156289 A1    May 21, 2020

(30) Foreign Application Priority Data
Jul. 11, 2017    (EP) .................................... 17180768

(51) Int. Cl.
*B29C 33/26*    (2006.01)
*B29C 70/34*    (2006.01)
(Continued)

(52) U.S. Cl.
CPC ............ *B29C 33/26* (2013.01); *B29C 70/345* (2013.01); *B29C 70/541* (2013.01); *B29L 2031/085* (2013.01)

(58) Field of Classification Search
CPC ................................ B25H 1/0035; B25H 1/08
See application file for complete search history.

(56) References Cited

U.S. PATENT DOCUMENTS

| 4,576,367 A | 3/1986 | Horn et al. | |
| 5,560,290 A * | 10/1996 | Kaneko | B21D 5/02 |
| | | | 192/131 H |

(Continued)

FOREIGN PATENT DOCUMENTS

| CN | 201357538 Y | 12/2009 |
| CN | 201833510 U | 5/2011 |

(Continued)

OTHER PUBLICATIONS

Search Report dated Sep. 28, 2018 issued in corresponding International Application No. PCT/EP2018/068759.

*Primary Examiner* — Galen H Hauth
(74) *Attorney, Agent, or Firm* — Nath, Goldberg & Meyer; Jerald L. Meyer; Tanya E. Harkins

(57) ABSTRACT

Disclosed is a clamping tong for securing a shell part of a wind turbine blade in a mould and a mould comprising a clamping tong. The clamping tong comprises a first tong segment, a second tong segment and a third tong segment. The third tong segment has a clamping surface for applying a clamping force on a mould section, such as a mould flange of the mould. The clamping tong is configured to reposition the clamping surface between a clamping state and a release state. The distance between the clamping surface and the first tong axis in the clamping state is shorter than the distance between the clamping surface and the first tong axis in the release state. Thereby, the clamping surface may provide the clamping force on the mould section in the clamping state. The first tong segment is attachable to the mould.

42 Claims, 15 Drawing Sheets

(51) Int. Cl.
     *B29C 70/54*          (2006.01)
     *B29L 31/08*          (2006.01)

(56)             References Cited

U.S. PATENT DOCUMENTS

| | | | |
|---|---|---|---|
| 2004/0231870 A1* | 11/2004 | McCormick | B25B 5/122 |
| | | | 173/217 |
| 2008/0086852 A1* | 4/2008 | Hall | F16B 2/06 |
| | | | 24/528 |
| 2012/0086144 A1* | 4/2012 | Coffield | B29C 70/76 |
| | | | 264/138 |
| 2017/0291235 A1* | 10/2017 | Drake, Jr. | B25B 5/145 |
| 2018/0071894 A1* | 3/2018 | Yoshimi | B25B 5/16 |

FOREIGN PATENT DOCUMENTS

| | | |
|---|---|---|
| CN | 106393090 A | 2/2017 |
| WO | 2014/162022 A1 | 10/2014 |
| WO | 2016/083504 A1 | 6/2016 |

\* cited by examiner a)

b)

c)

CLAMPING TONG FOR A WIND TURBINE BLADE SHELL MOULD

This is a National Phase Application filed under 35 U.S.C. 371 as a national stage of PCT/EP2018/068759, filed Jul. 11, 2018, an application claiming the benefit of European Application No. 17180768.8, filed Jul. 11, 2017, the content of each of which is hereby incorporated by reference in its entirety.

FIELD OF THE INVENTION

The present disclosure relates to manufacture of wind turbine blades for horizontal axis wind turbines (HAWTs). More specifically, the present disclosure pertains to the field of a clamping tong, such as a clamping tong for fixating a blade shell part in a blade shell mould, and a blade shell mould comprising a clamping tong.

BACKGROUND OF THE INVENTION

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, one of the two halves are turned upside down and positioned on top of the other halves, and the two halves are glued together.

The blade parts may be positioned on top of each other by turning and repositioning the complete half mould.

It is known for manufacturers of wind turbine blades, when manufacturing blades in two halves, that it is necessary to secure and prevent the one blade shell part from falling out of the mould, during turning of the mould, such as when positioning the one blade shell part on top of the other.

To prevent the shell of the blade to fall out of the mould, the shell is secured with a number of clamping tongs. Between use, the tongs are normally stored on a rack.

Each time the tongs are used, different tongs may be used in different positions on the mould. Thus, each time a tong is mounted on the mould, it has to be manually adjusted.

Manually adjusting the tong involves a risk that the tong is not tightened enough. Thus, there is a risk that the blade shell part may fall out of the mould during turning of the mould, causing both high costs as well as risk of injury on persons and material.

CN 21833510 U discloses a vane mold matching clamp formed by assembling an upper clamp of the mold matching clamp and a lower clamp of the mold matching clamp through an insertion pin, the casing is fixed on a mold in a mode of tightly pressing a flange edge of the casing through a press plate arranged at the front end of the upper clamp of the mold matching clamp.

SUMMARY OF THE INVENTION

It is an object of the present disclosure to provide a clamping tong and a wind turbine blade shell mould comprising a clamping tong, which overcomes at least some of the disadvantages of the prior art.

In particular, it is an object of the present invention to provide a clamping tong and a wind turbine blade shell mould which improves the procedure for moulding of wind turbine blades.

Thus, the present invention relates to a clamping tong for securing a shell part of a wind turbine blade in a mould for moulding the shell part. The clamping tong comprises a first tong segment, a second tong segment and a third tong segment.

The first tong segment extends along a first tong axis from a first primary end to a first secondary end.

The second tong segment extends along a second tong axis from a second primary end to a second secondary end. The second tong segment is attached at the second primary end to the first secondary end of the first tong segment.

The third tong segment extends from a third primary end to a third secondary end. The third tong segment is attached at the third primary end to the second secondary end of the second tong segment. The third tong segment has a clamping surface for applying a clamping force on a mould section, such as a mould flange of the mould.

The clamping tong is configured to reposition the clamping surface between a clamping state and a release state. The distance between the clamping surface and the first tong axis in the clamping state is shorter than the distance between the clamping surface and the first tong axis in the release state. Thereby, the clamping surface may provide the clamping force on the mould section in the clamping state.

The first tong segment is attachable, such as fixedly attachable, to the mould.

Also disclosed is a mould system for moulding a blade shell of a wind turbine blade. The mould system comprising a first mould for manufacturing a first blade shell part of the wind turbine blade and a second mould for moulding a second blade shell part of the wind turbine blade. The first mould and/or the second mould may have a longitudinal direction.

The first mould has a first moulding side with a first moulding surface that defines an outer shape of the first blade shell part and a first non-moulding side opposite the first moulding side. The first moulding surface may be a concave and/or female moulding surface of the first mould.

The second mould having a second moulding side with a second moulding surface that defines an outer shape of the second blade shell part and having a second non-moulding side opposite the second moulding side. The second moulding surface may be a concave and/or female moulding surface of the second mould.

The mould system is configured to position the first mould and the second mould such that the first moulding side is facing the second moulding side and such that the first blade shell part may be glued to the second blade shell part so as to form the blade shell of the wind turbine blade.

The first mould comprises a first mould flange along at least a part of the periphery of the first moulding surface. The first mould flange is configured to provide a first shell part flange on the first blade shell part.

The first mould comprises a plurality of primary clamping tongs being distributed along at least a part of the first mould flange. Each primary clamping tong of the plurality of primary clamping tongs may be a clamping tong in accordance with the clamping tong disclosed. Each primary clamping tong of the plurality of primary clamping tong comprises a first tong segment, a second tong segment and a third tong segment.

The first tong segment extends along a first tong axis from a first primary end to a first secondary end.

The second tong segment extends along a second tong axis from a second primary end to a second secondary end. The second tong segment is attached at the second primary end to the first secondary end of the first tong segment.

The third tong segment extends from a third primary end to a third secondary end. The third tong segment is attached at the third primary end to the second secondary end of the second tong segment. The third tong segment has a clamping surface for applying a clamping force on a mould section, such as a mould flange of the mould.

Each primary clamping tong of the plurality of primary clamping tongs is configured to reposition the clamping surface between a clamping state and a release state. The distance between the clamping surface and the first tong axis in the clamping state is shorter than the distance between the clamping surface and the first tong axis in the release state. Thereby, the clamping surface may provide the clamping force on the mould section in the clamping state.

Each primary clamping tong of the plurality of primary clamping tongs are connected, such as fixedly connected, to the first non-moulding side of the first mould.

It is an advantage of the present disclosure that a tong is provided that is specifically adapted for fixing a blade shell part in a blade shell mould. Furthermore, the present disclosure provides that positions of the tongs on the mould may be maintained, and standardised clamping pressure may be applied to standardised positions. Risk of failure and/or accidents may thereby be reduced.

It is a further advantage of the present disclosure that fixation of the blade shell part is made easier and more reliable, lowering production time and costs.

It is a further advantage of the present disclosure that fixation of the blade shell part may provide for a more automated process.

The second mould may comprise a second mould flange along at least a part of the periphery of the second moulding surface. The second mould flange may be configured to provide a second shell part flange on the second shell part. The second mould may comprise a plurality of secondary clamping tongs being distributed along at least a part of the second mould flange.

The disclosed clamping tong may be a primary clamping tong of the plurality of primary clamping tongs of the first mould. Alternatively, or additionally, the disclosed clamping tong may be a secondary clamping tong of a plurality of secondary clamping tongs of the second mould.

The first tong segment may be adjustable along the first tong axis, such as between a first retracted state and a first extended state. In the first retracted state the first tong segment may have a first retracted length between the first primary end and the first secondary end. In the first extended state, the first tong segment may have a first extended length between the first primary end and the first secondary end. The first extended length may be longer than the first restricted length. Thereby, the clamping tong may be repositioned. For example, the clamping tong may be repositioned to provide for release and/or removal of the clamping tong after turning of the mould. Alternatively or additionally, repositioning of the damping tong may facilitate positioning of the clamping tong in a position, e.g. a storing position, where the clamping tong does not obstruct or impede work during the moulding process.

The clamping tong may comprise a repositioning actuator. The repositioning actuator may have a first repositioning actuator end and a second repositioning actuator end. The repositioning actuator in a retracted repositioning actuator state may have a retracted length between the first repositioning actuator end and the second repositioning actuator end. The repositioning actuator in an extended repositioning actuator state may have an extended length between the first repositioning actuator end and the second repositioning actuator end. The extended length may be longer than the retracted length. The repositioning actuator may be configured to adjust the first tong segment along the first tong axis, e.g. between the first retracted state and the first extended state.

The repositioning actuator may be a pneumatic or a hydraulic piston. The repositioning actuator may be an electro-mechanical actuator, such as a linear electro-mechanical actuator.

The repositioning actuator may be configured to position the first tong segment in the first extended state, e.g. by attaining the extended repositioning actuator state. Alternatively or additionally, the repositioning actuator may be configured to position the first tong segment in the first retracted state, e.g. by attaining the retracted repositioning actuator state.

The repositioning actuator may be configured to attain the extended repositioning actuator state upon receipt of a first repositioning actuator input, such as a positive pressure, and/or a pressure, e.g. a positive pressure, at a first input port. Alternatively or additionally, the repositioning actuator may be configured to attain the retracted repositioning actuator state upon receipt of a second repositioning actuator input, such as a negative pressure, and/or a pressure, e.g. a positive pressure, at a second input port. Thus, the repositioning actuator may be single acting or dual acting.

The first repositioning actuator end may be attachable to the mould. The second repositioning actuator end may be attached to the first secondary end of the first tong segment and/or the second repositioning actuator end may be attached to the second tong segment. Alternatively, the first repositioning actuator end may be attached to one of a plurality of parts of the first tong segment and the second repositioning actuator end may be attached to another of the plurality of parts of the first tong segment.

The first tong segment may comprise a plurality of first parts. For example, the first tong segment may comprise a plurality of first parts extending inside each other to provide a telescopically extendable first tong segment. For example, the first tong segment may comprise proximal first part, such as an outer first part. The proximal first part, such as the outer first part, may extend from the first primary end. The first tong segment may comprise a distal first part, such as an inner first part. The distal first part, such as the inner first part, may extend to the first secondary end. The distal first part, such as the inner first part, may be slidable along the first tong axis relative to the proximal first part, such as the outer first part. The distal first part, such as the inner first part, may extend inside the proximal first part, such as the outer first part, and the distal first part, such as the inner first part, may be slidable along the first tong axis relative to the proximal first part, such as the outer first part.

The proximal first part, such as the outer first part may be attachable, such as fixedly attachable, to the mould.

The first tong segment may comprise an intermediate first part. The intermediate first part may extend inside the proximal first part outer first part. The distal first part/inner first part may extend inside the intermediate first part. The intermediate first part may be slidable along the first tong axis relative to the proximal first part/outer first part. The distal first part/inner first part may be slidable along the first tong axis relative to the intermediate first part.

The proximal first part/outer first part, the distal first part/inner first part and/or the intermediate first part may be cylindrical. The proximal first part/outer first part, the distal first part/inner first part and/or the intermediate first part may have a circular cross section, e.g. along the first tong axis. A circular cross section of the proximal first part/outer first part, the distal first part/inner first part and/or the intermediate first part may allow for rotation between one or more of the proximal first part/outer first part, the distal first part/inner first part and/or the intermediate first part. For example, the distal first part/inner first part and/or the intermediate first part may be rotatable relative to the proximal first part/outer first part, such as about the first tong axis, and/or the distal first part/inner first part may be rotatable relative to the intermediate first part, such as about the first tong axis.

The first parts, such as the proximal first part/outer first part, the distal first part/inner first part and/or the intermediate first part may be coupled to prevent decoupling or separation of the first parts. Thereby, it may be prevented that parts of one clamping tong is exchanged with parts of another clamping tong by mistake, and/or that parts of a clamping tong are being lost.

The second tong segment may be rotatable about the first tong axis or an axis parallel to the first tong axis. For example, such as to position the third tong segment above or below the mould flange. A rotational joint, such as a first rotational joint, may be provided to allow rotation of the second tong segment. The rotational joint may allow rotation about the first tong axis or an axis parallel to the first tong axis. The first tong segment may comprise the rotational joint. The rotational joint may allow rotation between the first primary end and the first secondary end. The rotation of the second tong segment may be obtained by rotation of the distal first part/inner first part relative to the proximal first part/outer first part. Alternatively, the rotational joint may be provided between the second tong segment and the first secondary end of the first tong segment.

The second tong segment and/or the third tong segment may be rotatable about the second tong axis or an axis parallel to the second tong axis. For example, such as to position the third tong segment parallel to a longitudinal direction of the mould. A rotational joint, such as a second rotational joint, may be provided to allow rotation of the second tong segment. The second rotational joint may allow rotation about the second tong axis or an axis parallel to the second tong axis. The first tong segment may comprise the second rotational joint. The second rotational joint may allow rotation between the first primary end and the first secondary end. The second rotational joint may be provided between the second tong segment and the first secondary end of the first tong segment.

The first parts of the first tong segment may comprise grooves and pins, such as to define allowable movement between the first parts and/or to prevent disengagement of the first parts. The grooves may define the first retracted state and the first extended state of the first tong segment.

The proximal first part/the outer first part may comprise a first outer groove, such as a groove for engagement of a pin of a part extending inside the proximal first part/outer first part, such as the intermediate first part and/or the distal first part/inner first part.

The intermediate first part may comprise a first intermediate pin. The first intermediate pin may be in engagement with the first outer grove. The first outer groove may define a path of movement of the intermediate first part relative to the proximal first part/outer first part. The first outer groove may be a straight longitudinal groove, such as to allow only a movement of the intermediate first part along the first tong axis. Alternatively, the first outer groove may be a curved groove, such as to allow a combined movement along the first tong axis and a turning about the first tong axis.

The intermediate first part may comprise a first intermediate groove, such as a groove for engagement of a pin of a first part extending inside the intermediate first part, such as the distal first part/inner first part.

The distal first part/inner first part may comprise a first inner pin. The first inner pin may be in engagement with the first intermediate grove. The first intermediate groove may define a path of movement of the distal first part/inner first part relative to the intermediate first part. The first intermediate groove may be a straight longitudinal grove followed by a transverse groove, such as to allow for extension of the distal first part/inner first part relative to the intermediate first part followed by rotation of the distal first part/inner first part relative to the intermediate first part.

The first inner pin may be in engagement with the first outer grove. The first outer groove may define a path of movement of the distal first part/inner first part relative to the proximal first part/outer first part. The first outer groove may be a straight longitudinal grove followed by a transverse groove, such as to allow for extension of the distal first part/inner first part relative to the intermediate first part followed by rotation of the distal first part/inner first part relative to the intermediate first part.

The first inner pin and/or the first intermediate pin may be shorter than the thickness of the intermediate first part and/or proximal first part/outer first part. In particular, the first inner pin may be shorter than the thickness of the intermediate first part, e.g. to prevent the first inner pin from protruding to the outside of the intermediate first part, e.g. to prevent the first inner pin to abut an edge of the proximal first part/outer first part thereby restricting retraction of the intermediate first part into the proximal first part/outer first part.

The first tong segment may comprise a primary proximal first part. The first tong segment may comprise a secondary proximal first part. The primary proximal first part and/or the secondary proximal first part may form part of the proximal part. The first tong segment may comprise a primary distal first part. The first tong segment may comprise a secondary distal first part. The primary distal first part and/or the secondary distal first part may form part of the distal part. The primary proximal first part and/or the secondary proximal first part may extend from the first primary end. The primary distal first part and/or the secondary distal first part may extend to the first secondary end.

The primary proximal first part and the primary distal first part may be rotationally coupled to allow a rotation of the primary proximal first part relative to the primary distal first part about a primary axis, e.g. perpendicular to the first tong axis. The secondary proximal first part and the secondary distal first part may be rotationally coupled to allow a rotation of the secondary proximal first part relative to the secondary distal first part about a secondary axis, e.g. perpendicular to the first tong axis.

The tong segments may be rigidly attached to each other. The second tong segment may be rigidly attached to the first tong segment, such as to the distal first part/inner first part of the first tong segment. The third tong segment may be rigidly attached to the second tong segment.

The second tong axis may be perpendicular to the first tong axis. The third tong axis may be perpendicular to the second tong axis. The third tong axis may be parallel to the first tong axis. The first tong segment, the second tong segment and/or the third tong segment may be arranged such that the second tong axis is perpendicular to the first tong axis, and/or such that the third tong axis is perpendicular to the second tong axis, and/or such that the third tong axis is parallel to the first tong axis.

The first tong axis and/or the third tong axis may be parallel to the mould flange, such as the first mould flange and/or the second mould flange, e.g. when the clamping tong is attached to the first mould and/or the second mould. The second tong axis may be perpendicular to the mould flange.

The clamping tong may be configured to be in a storing position, such as a position wherein the clamping tong is positioned on the non-moulding side of the mould flange, such as the first mould flange and/or the second mould flange, and wherein the clamping tong does not extend beyond the periphery of the mould flange. Such storing position will prevent or at least reduce the risk of the clamping tong obstructing or impeding other work on the mould.

The second tong segment may be adjustable along the second tong axis between a second retracted state and a second extended state. In the second retracted state the second tong segment may have a second retracted length between the second primary end and the second secondary end. In the second extended state the second tong segment may have a second extended length between the second primary end and the second secondary end. The second extended length may be longer than the second restricted length. Varying the length of the second tong segment may provide varying the distance between the clamping surface and the first tong axis. Varying the length of the second tong segment may provide repositioning of the clamping surface between the clamping state and the release state, such as along the second tong axis. Alternatively, the clamping surface may be repositioned without the second tong segment being adjustable.

The clamping tong may comprise a locking mechanism for positioning and/or locking the clamping surface in the clamping state.

The locking mechanism may comprise a first locking arm. The locking mechanism may comprise a second locking arm. The first locking arm and/or the second locking arm may be translatable along the second tong axis. The first locking arm and/or the second locking arm may be acting on the clamping surface to translate movement of the first locking arm and/or the second locking arm along the second tong axis to movement of the clamping surface along the second tong axis. Alternatively, the first locking arm and/or the second locking arm may be rotatable about a pivot axis perpendicular to the first tong axis and the second tong axis, such as to function as a lever arm. The first locking arm and/or the second locking arm may be acting on the clamping surface about the pivot axis to translate movement of the first locking arm and/or the second locking arm, e.g. a movement point of the first locking arm and/or the second locking arm, along the second tong axis to an opposite movement of the clamping surface along the second tong axis.

The locking mechanism may comprise a locking handle configured to be in a locked state or in an unlocked state. The locking handle may be connected to the first locking arm and/or the second locking arm, such that when the locking handle is shifted from the unlocked state to the locked state the locking handle may affect the first locking arm and/or the second locking arm in a direction along the second tong axis, and the first locking arm and/or the second locking arm acts on the clamping surface to reposition the clamping surface to the clamping state. When the locking handle is shifted from the locked state to the unlocked state the locking handle the locking handle may affect the first locking arm and/or the second locking arm to allow movement of the first locking arm and/or the second locking arm in a direction along the second tong axis to allow repositioning of the clamping surface to the release state.

The locking mechanism may comprise a shaft extending through the second tong segment. The shaft may have a first shaft end and a second shaft end. The locking handle may be connected to the shaft at the first shaft end. The first locking arm and/or the second locking arm may be connected to the shaft at the second shaft end. The first locking arm and the second locking arm may be connected to the shaft on opposite sides of the shaft at the second shaft end. By utilizing a shaft, the locking handle may be positioned at the second primary end of the second tong segment.

The shaft may be adjustable, e.g. the length between the locking handle and the first locking arm and/or second locking arm may be adjustable. For example, the shaft may be provided with a linear actuator to adjust the length of the shaft. Alternatively, or additionally, manual adjusting of the length of the shaft may be provided. Utilizing an adjustable shaft, the clamping force may be adjusted.

The locking mechanism may comprise a fastening actuator. The fastening actuator may have a first fastening actuator end and a second fastening actuator end. The fastening actuator may, in a retracted fastening actuator state, have a retracted length between the first fastening actuator end and the second fastening actuator end. The fastening actuator may, in an extended fastening actuator state, have an extended length between the first fastening actuator end and the second fastening actuator end. The extended length may be longer than the retracted length. The fastening actuator may be configured to adjust the distance between the clamping surface and the first tong axis, e.g. such as to position the damping surface in the clamping state and/or release state.

The fastening actuator may be a pneumatic or hydraulic piston. Alternatively, the fastening actuator may be an electromechanical actuator, such as a linear actuator.

The fastening actuator may be configured to position the clamping surface in the clamping state by attaining the extended fastening actuator state. Alternatively or additionally, the fastening actuator may be configured to position the clamping surface in the release state by attaining the retracted fastening actuator state.

The fastening actuator may be configured to attain the extended fastening actuator state upon receipt of a first fastening actuator input, such as a positive pressure, and/or a pressure, e.g. a positive pressure, at a first input port. Alternatively or additionally, the fastening actuator may be configured to attain the retracted fastening actuator state upon receipt of a second fastening actuator input, such as a negative pressure, and/or a pressure, e.g. a positive pressure, at a second input port. The fastening actuator may be dual acting.

The locking mechanism may comprise a knee joint element, e.g. extending from a first knee joint end to a second knee joint end. The knee joint element may comprise a first knee joint part having the first knee joint end and a second knee joint part having the second knee joint end. The first knee joint part and the second knee joint part may be hingedly connected at a knee joint coupling point, e.g. to allow relative rotation between the first knee joint part and the second knee joint part about a knee joint axis. The knee joint element may have a knee joint length from the first knee joint end to the second knee joint end.

The knee joint element may be adjustable between a first knee joint state and a second knee joint state. In the first knee joint state the knee joint length may be a first knee joint length. In the second knee joint state the knee joint length may be a second knee joint length. The second knee joint length may be longer than the first knee joint length. In an intermediate knee joint state, between the first knee joint state and the second knee joint state, the knee joint length may be a maximum knee joint length. The maximum knee joint length may be longer than the first knee joint length. The maximum knee joint length may be longer than the second knee joint length.

The knee joint element may be coupled to the clamping surface, e.g. such that the clamping surface is in the clamping state when the knee joint element is in the second knee joint state and/or such that the clamping surface is in the release state when the knee joint element is in the first knee joint state.

The first knee joint end may be connected to the movement point of the first locking arm and/or the second locking arm, e.g. such that the extension or retraction of the knee joint element is translated to a movement of the movement point of the first locking arm and/or the second locking arm, e.g. along the second tong axis, such as to provide a movement of the damping surface to the clamping state and/or release state.

The locking mechanism may comprise a spring element. The spring element may provide a spring force to the second knee joint end towards the first knee joint end. The spring element may be composed of a plurality of disc springs.

The first knee joint state and the second knee joint state being on opposite sides of the intermediate knee joint state, provides that a force, e.g. counteracting the spring force of the spring element is needed in order to change the knee joint state between the first knee joint state and the second knee joint state. Thereby, the clamping tong may remain in the release state and/or the clamping state in the absence of a force configured to change between the states of the knee joint element. Thereby enhancing safety of the clamping tong by avoiding that e.g. maintenance of a certain hydraulic or pneumatic pressure is needed to maintain the damping tong in the clamping state and/or release state.

The first fastening actuator end may be attached to the knee joint coupling point, e.g. such that the fastening actuator is configured to position the knee joint element in the second knee joint state by attaining the extended fastening actuator state, and/or such that the fastening actuator is configured to position the knee joint element in the first knee joint state by attaining the retracted fastening actuator state.

The clamping force applied by the clamping surface on the mould flange may be between 400-1200 N, such as 600 N. The clamping tong may be configured to be able withstand a force of more than 1200 N, such as more than 1400, such as more than 1600 N.

Retaining the blade shell part in the mould by use of the clamping tong as disclosed may be combined with vacuum suction in the mould.

The clamping tong may comprise an indicator, such as a visual indicator. The indicator may be configured to indicate the clamping state, such as being configured to indicate the clamping surface being in the clamping state and/or being configured to indicate the clamping surface being in the release state.

The mould such as the first mould and/or the second mould may comprise a plurality of clamping tongs being distributed along at least a part of the mould flange, such as the first mould flange and/or the second mould flange. Distance between clamping tongs along the mould flange may be between 0.5-3 m, such as 1-2 m. The distance between clamping tongs may vary between sections of the mould, e.g. the distance between clamping tongs may be shorter at the root end of the mould compared to the distance between clamping tong at the tip end of the mould.

The mould system is configured to position the first mould and the second mould such that the first moulding side is facing the second moulding side and such that the first blade shell part may be glued to the second blade shell part so as to form the blade shell of the wind turbine blade. The mould system may comprise a positioning device to position the first mould and the second mould such that the first moulding side is facing the second moulding side and such that the first blade shell part may be glued to the second blade shell part so as to form the blade shell of the wind turbine blade. The first mould may be configured to be rotated and positioned on top of the second mould and/or the second mould may be configured to be rotated and positioned on top of the second mould. The mould system may be configured to rotate and position the first mould on top of the second mould, such that the first moulding side is facing the second moulding side. The positioning device may be configured to rotate and position the first mould on top of the second mould, such that the first moulding side is facing the second moulding side. Alternatively, or additionally, the mould system may be configured to rotate and position the second mould on top of the first mould, such that the first moulding side is facing the second moulding side. The positioning device may be configured to rotate and position the second mould on top of the first mould, such that the first moulding side is facing the second moulding side.

The first mould may be an upwind mould, such as a mould for manufacturing an upwind shell part of the blade shell. The second mould may be a downwind mould, such as a mould for manufacturing a downwind shell part of the blade shell.

The mould system may comprise a positioning device configured to turn and/or position the first mould and/or second mould.

Also disclosed is a control system for controlling repositioning of clamping surfaces between a clamping state and a release state of a plurality of clamping tongs. The mould system may comprise such control system. The control system comprises a first control input location located at a first location. And the control system comprises a second control input location located at a second location. The second location being separated from the first location by at least 5 meters, such as at least 10 meters such as at least 20 meters, such as at least 50 meters.

Thus, the control system may provide for enhanced safety in remotely operating clamping tongs, e.g. by two operators having to simultaneously provide similar input in order to reposition between clamping state and release state.

The control system may be configured to reposition the clamping surface to a clamping state of each clamping tong, such as each primary clamping tong of the plurality of primary clamping tongs, e.g. upon simultaneously receiving a clamping state input from the first control input location and the second control input location.

The control system may be configured to reposition the clamping surface to a release state of each clamping tong, such as each primary clamping tong of the plurality of primary clamping tongs, e.g. upon simultaneously receiving a release state input from the first control input location and the second control input location.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

Figure 1:
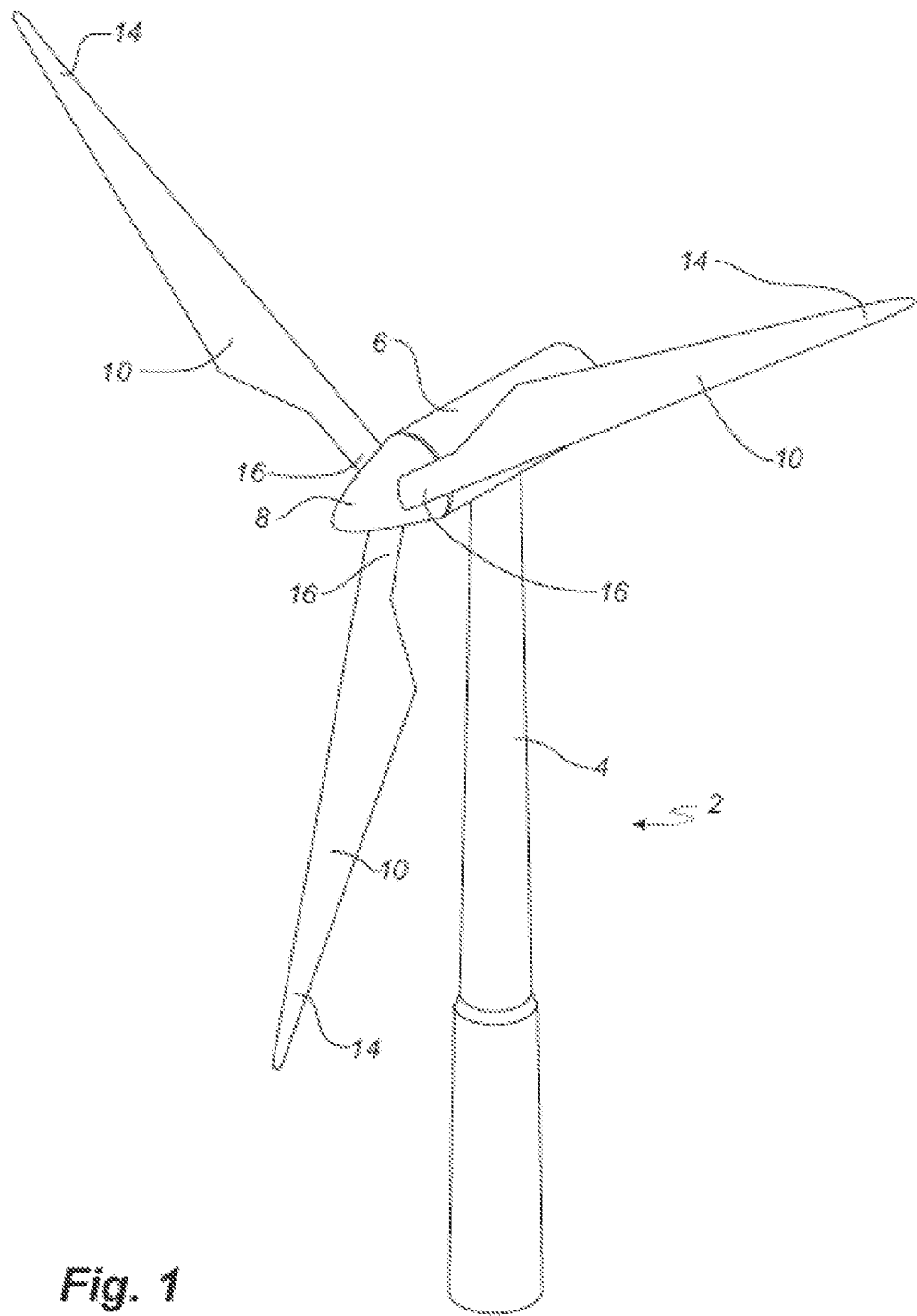
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
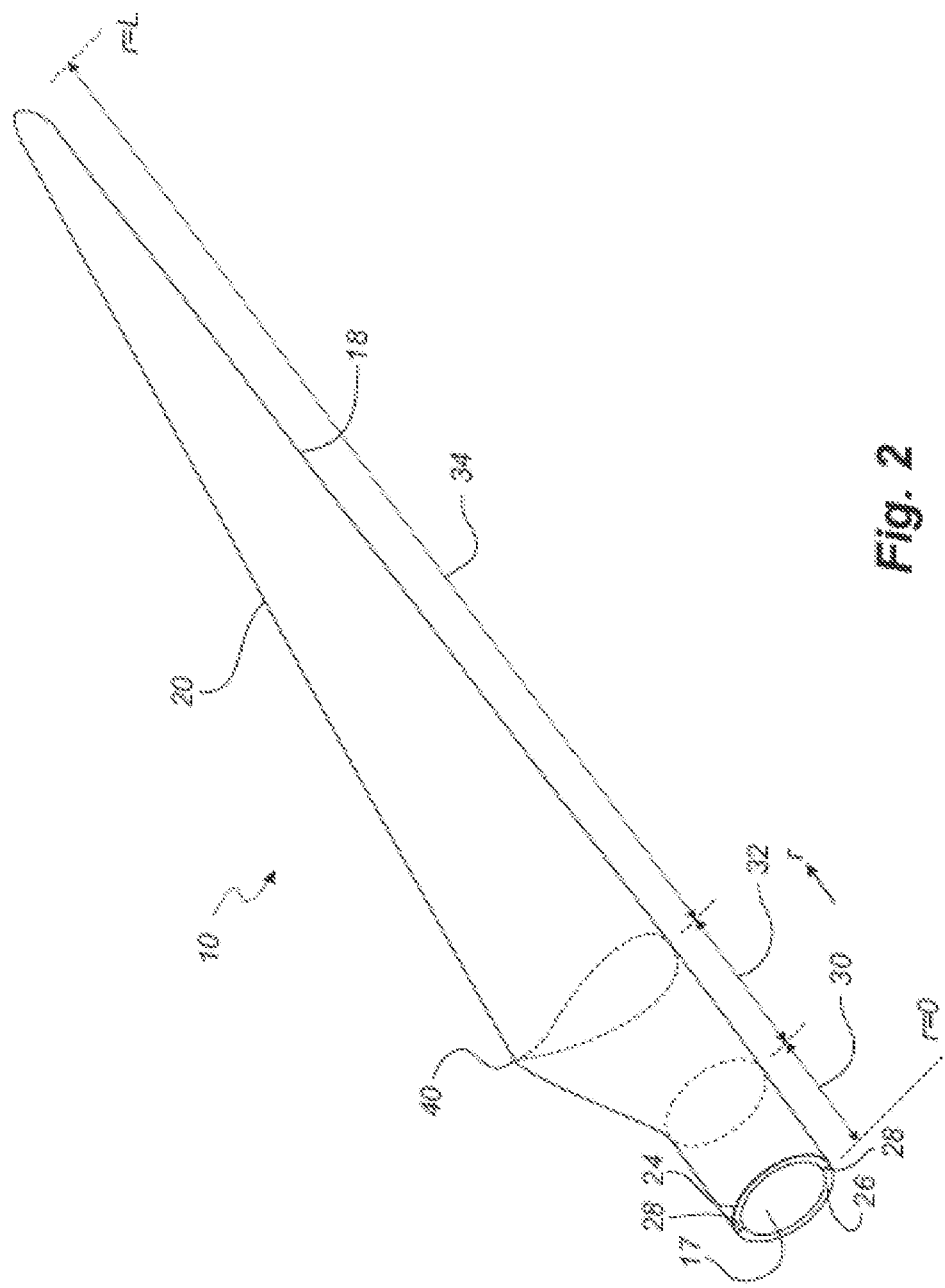
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3A:
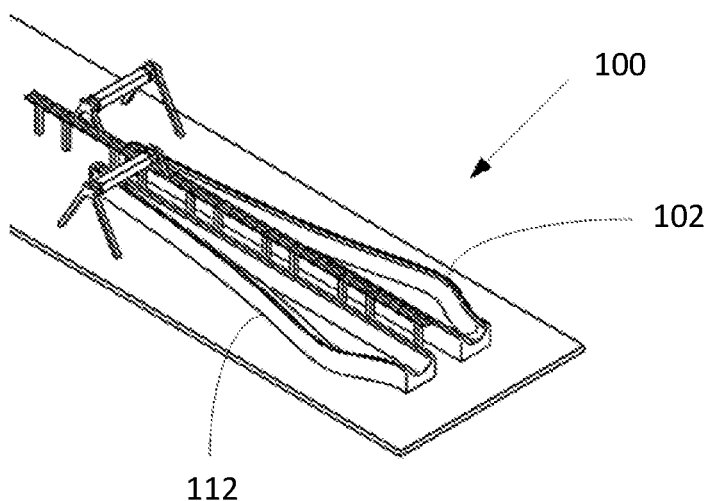
FIG. 3a-b is a schematic diagram illustrating an exemplary mould system.

FIG. 3a is a schematic diagram illustrating in a perspective view an exemplary mould system 100 for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade.

Figure 3B:
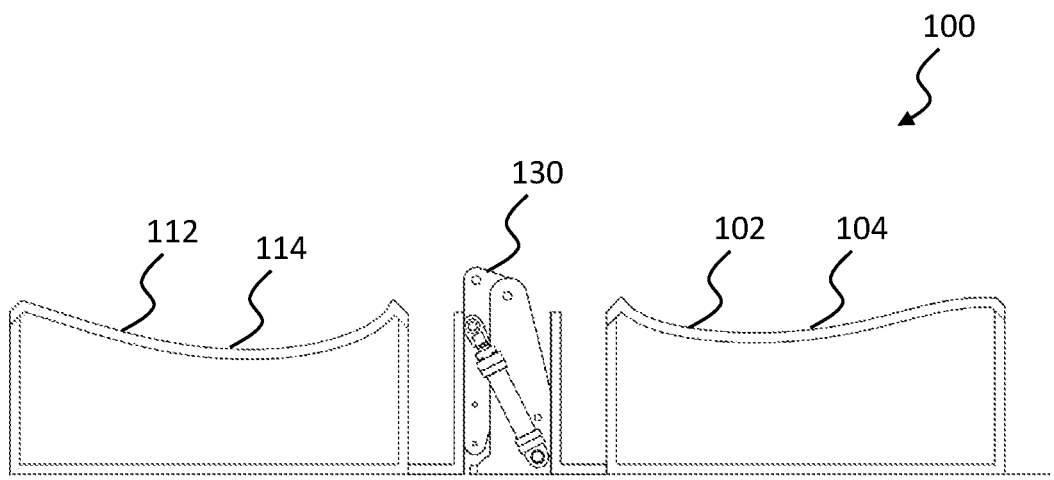

FIG. 3b is a schematic diagram illustrating in a cross sectional view the exemplary mould system 100 for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade. The mould system 100 further comprises a positioning device 130 configured for positioning the first mould 102 and the second mould 112 such that a first moulding side 104 of the first mould 102 is facing a second moulding side 114 of the second mould 112. The positioning device 130 may be configured for lifting and rotating the first mould 102.

Figure 4:
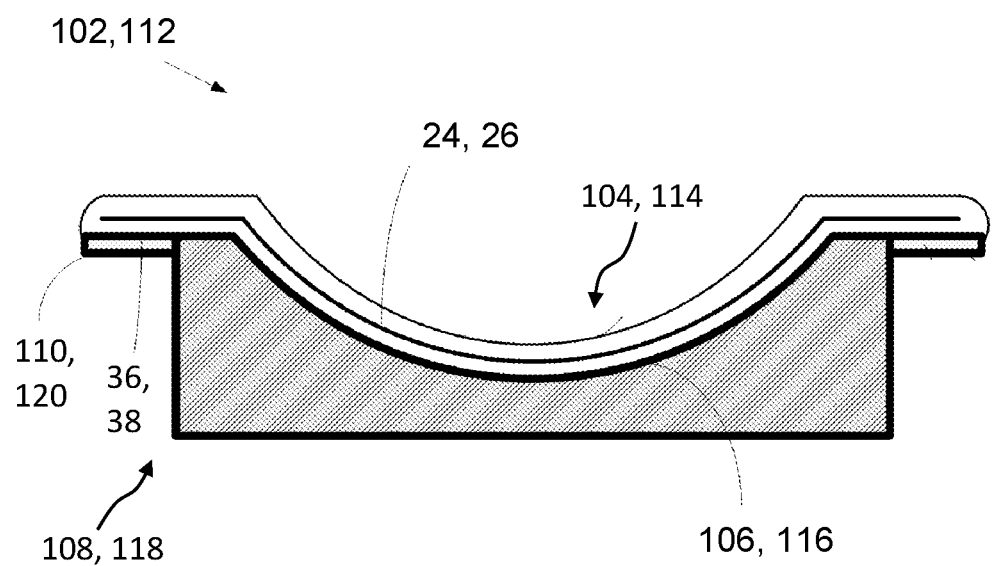
FIG. 4 is a schematic diagram illustrating an exemplary mould.

FIG. 4 is a schematic diagram illustrating an exemplary mould 102, 112, such as a first mould 102 for manufacturing a first blade shell part 24 of a wind turbine blade or a second mould 112 for manufacturing a second blade shell part 26 of the wind turbine blade.

The mould 102, 112 has a moulding side 104, 114, with a moulding surface 106, 116 that defines an outer shape of the blade shell part 24, 26. The mould 102, 112 has a non-moulding side 108, 118 opposite the moulding side 104, 114.

the mould 102, 112 comprises a mould flange 110, 120 along at least a part of the periphery of the moulding surface 106, 116. The mould flange 110, 120 provides a shell part flange 36, 38 on the blade shell part 24, 26.

Figure 5:
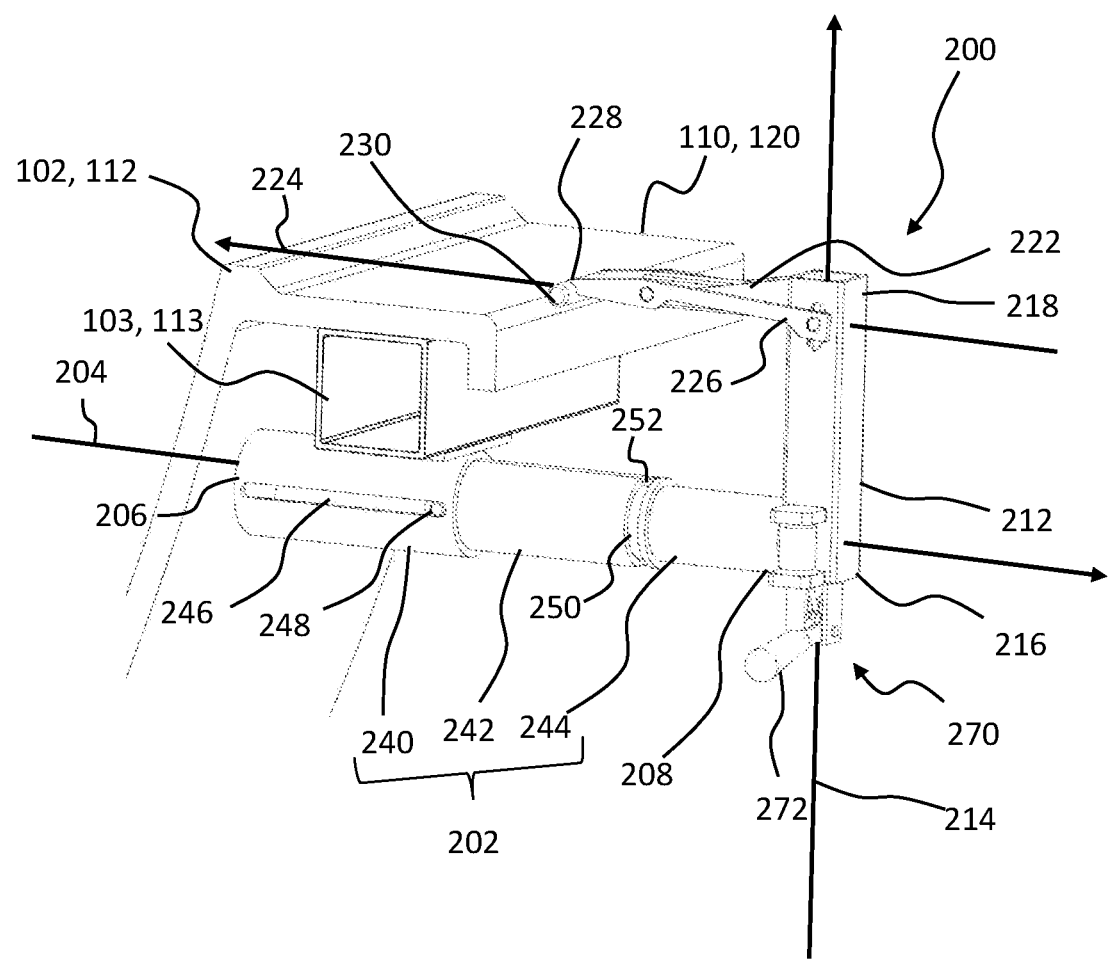
FIG. 5 is a schematic diagram illustrating an exemplary mould with an exemplary clamping tong.

FIG. 5 is a schematic diagram illustrating an exemplary mould 102, 112 with an exemplary clamping tong 200. The mould 102, 112 may be a first mould 102 and/or a second mould 112 of a mould system, such as a mould system as shown in previous figures. The clamping tong 200 may be a primary clamping tong being distributed along at least a part of the first mould flange 110 of the first mould 102 and/or the damping tong 200 may be a secondary clamping tong being distributed along at least a part of the second mould flange 120 of the second mould 112.

The clamping tong 200 comprises a first tong segment 202. The first tong segment 202 extends along a first tong axis 204. The first tong segment 202 extends from a first primary end 206 to a first secondary end 208. The first tong segment 202 may comprise a plurality of parts, such as two parts or three parts as shown. In the illustrated example, the first tong segment 202 comprises an outer first part 240, e.g. a proximal first part, an intermediate first part 242 and an inner first part 244, e.g. a distal first part. The outer first part 240 extends from the first primary end 206. The intermediate first part 242 extends inside the outer first part 240. The inner first part 244 extends inside the intermediate first part 242. The inner first part 244 extends to the first secondary end 208.

The intermediate first part 242 and the inner first part 244 are slidable along the first tong axis 204 relative to the outer first part. The inner first part 244 is slidable along the first tong axis 204 relative to the intermediate first part 242. The first parts 240, 242, 244 of the first tong segment 202 provides that the first tong segment 202 may be telescopically extended along the first tong axis 204. Hence, the first tong segment 202 is adjustable along the first tong axis 204 between a first retracted state and a first extended state.

The inner first part 244 is rotatable, e.g. relative to the intermediate first part 242 and/or relative to the outer first part 240, about the first tong axis 204. Thus, the first secondary end 208 may be rotated relative to the first primary end 206. Thereby the second tong segment 212 may be rotatable about the first tong axis 204.

The slidable movement and/or rotation between the first parts 240, 242, 244 of the first tong segment may be determined by grooves and pins. For example, the outer first part 240 may comprise a first outer groove 246, as shown, and the intermediate first part 242 may comprise a first intermediate pin 248 engaged in the first outer groove 246. The first outer groove 246 thereby defines a path of movement of the intermediate first part 242 relative to the outer first part 240. For example, the first outer groove 246 may be a straight longitudinal line parallel to the first tong axis 204, as shown, thereby allowing the intermediate first part 242 to be moved along the first tong axis 204.

The intermediate first part 242 may comprise a first intermediate groove 250, as shown, and the inner first part 244 may comprise a first inner pin 252 engaged in the first intermediate groove 250. The first intermediate groove 250 thereby defines a path of movement of the inner first part 244 relative to the intermediate first part 242. For example, the first intermediate groove 250 may comprise a longitudinal straight line segment parallel to the first tong axis 204, as shown, allowing the inner first part 244 to be moved along the first tong axis 204. At the end of the longitudinal straight line segment, the first intermediate groove 250 may comprise a transverse line segment perpendicular to the first tong axis 204, as shown, allowing the inner first part 244 to be rotated about the first tong axis 204 after being extended along the first tong axis 204. The first intermediate groove 250 may furthermore comprise another longitudinal line segment on the opposite side extending from the other end of the transverse line segment, such that the inner first part 244 may be retracted and extended relative to the intermediate first part 242, both when the second tong segment 212 is in an upwards pointing position (as shown) and in a downwards pointing position.

The clamping tong 200 comprises a second tong segment 212. The second tong segment extends along a second tong axis 214. The second tong segment extends from a second primary end 216 to a second secondary end 218. The second tong segment 212 is attached at the second primary end 216 to the first secondary end 208 of the first tong segment 202. The second tong segment 212 may be rigidly attached to the first tong segment 202.

The second tong segment 212 is rotatable about the first tong axis 204, such that the second tong segment 212 may point upwards or downwards. The first tong segment 202 may comprise a rotational joint, such as a first rotational joint, to allow rotation of the second tong segment 212 about the first tong axis. For example, the rotation of the second tong segment 212 may be provided by a rotational relationship between one or more first parts 240, 242, 244 of the first tong segment 202, as explained above. In other exemplary embodiments, the second tong segment 212 may be rotatable about an axis parallel to the first tong axis 204.

The clamping tong 200 comprises a third tong segment 222. The third tong segment 222 extends along a third tong axis 224. The third tong segment 222 extends from a third primary end 226 to a third secondary end 228. The third tong segment 222 is attached at the third primary end 226 to the second secondary end 218 of the second tong segment 212. The third tong segment 222 may be rigidly attached to the second tong segment 212.

The clamping tong 200 has a clamping surface 230. The third tong segment 222 may comprise the clamping surface 230. The clamping surface 230, here shown as a cylinder-shaped element, is configured for applying a clamping force on a mould section, such as a mould flange 110, 120. The clamping tong 200 is configured to reposition the clamping surface 230 between a clamping state and a release state, such that in the clamping state the distance between the clamping surface 230 and the first tong axis 204 is decreased as compared to the distance in the release state.

The clamping tong 200 comprises a locking mechanism 270 for positioning and locking the clamping surface 230 in the clamping state. The locking mechanism 270 comprises a locking handle 272 configured to be in a locked state or in an unlocked state. The locking mechanism 270 is configured such that when the locking handle 272 is brought into the locked state the clamping surface 230 is brought into the clamping state, and when the locking handle 272 is brought into the unlocked state the clamping surface is brought into the release state.

The clamping tong 200 is attached, such as fixedly attached, to the mould 102, 112, such as to a frame structure 103, 113 of the mould 102, 112. The clamping tong 200 may be attached to the mould 102, 112 by the first tong segment 202 being attached, such as fixedly attached, to the mould 102, 112, such as the outer first part 240 of the first tong segment 202 being attached, such as fixedly attached, to the mould 102, 112.

The clamping tong 200 may be welded to the mould 102, 112, such as welded to the frame structure 103, 113 of the mould. Alternatively, the clamping tong 200 may be attached to the mould 102, 112 and/or the frame structure 103, 113 by use of bolts or other fastening means.

As shown in the example, the second tong axis 214 may be perpendicular to the first tong axis 204, the third tong axis 224 may be perpendicular to the second tong axis 214, and the third tong axis 224 may be parallel to the first tong axis 204.

FIG. 6*a-d* are schematic diagrams illustrating an exemplary mould 102,112 with an exemplary clamping tong 200 in various positions, such as the mould and clamping tong as described in relation to FIG. 4 in various positions.

Figure 6:
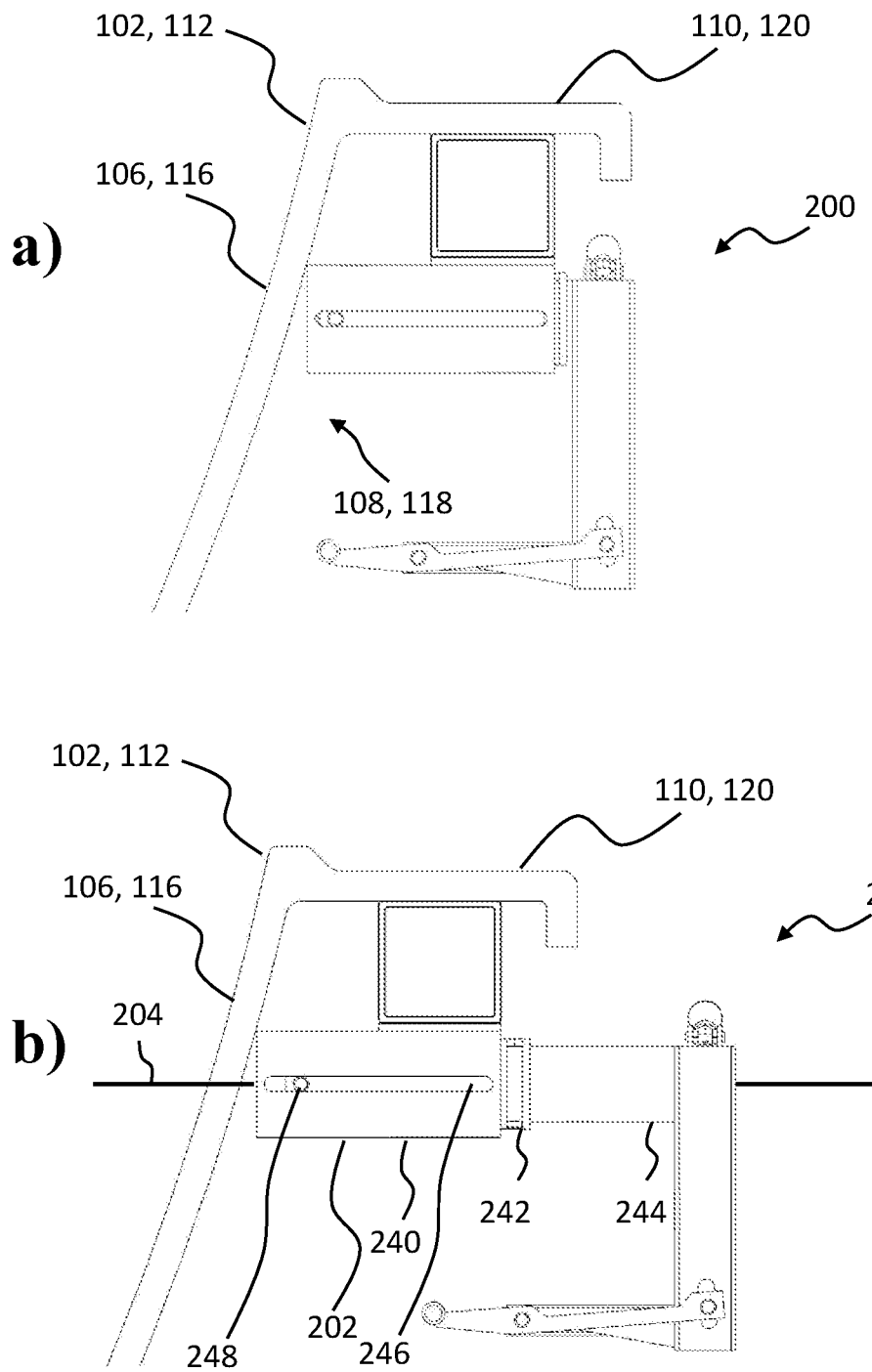
FIG. 6a-d are schematic diagrams illustrating an exemplary mould with an exemplary clamping tong in various positions.
Figure 6:
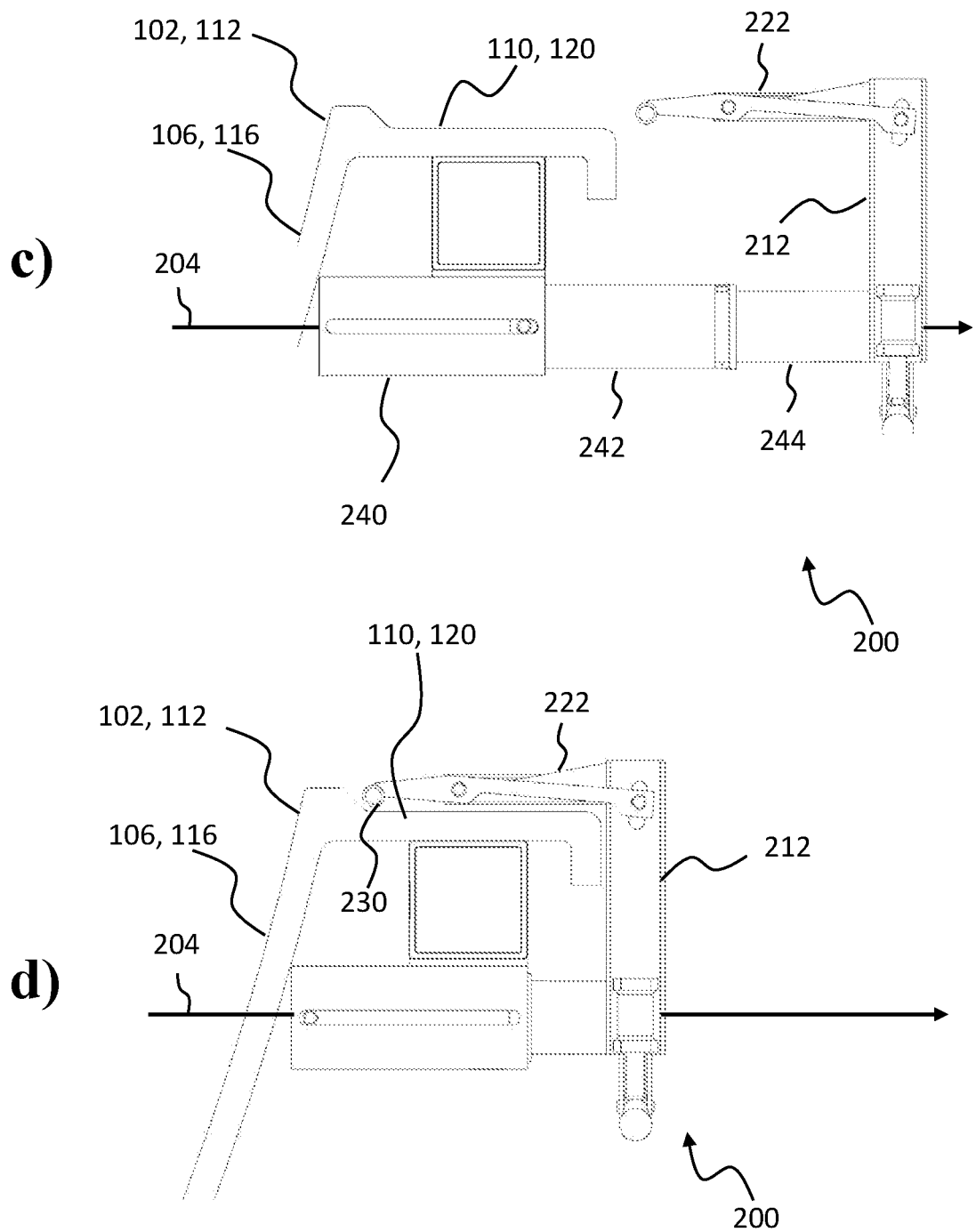

FIG. 6*a* shows the clamping tong 200 in a storing position, such as a position wherein the clamping tong 200 is retained underneath the mould flange 110, 120. In the storing position the clamping tong 200 is positioned on the non-moulding side 108, 118, such as on the non-moulding side 108, 118 of the mould flange 110, 120. In the storing position the clamping tong 200 is positioned such that the clamping tong 200 does not extend beyond the periphery of the mould flange 110, 120.

FIG. 6*b* shows the clamping tong 200 in a semi-extended position. Relative to the storing position (FIG. 6*a*), the first tong segment 202 has been partly extended along the first tong axis 204. The inner first part 244 has been extended from the intermediate first part 242, and the intermediate first part 242 has been slightly extended from the outer first part 240. It is seen that the first intermediate pin 248 has moved in the first outer groove 246 caused by the slight extension of the intermediate first part 242.

FIG. 6*c* shows the clamping tong 200 in a fully extended and turned position. Relative to the semi-extended position (FIG. 6*b*), the intermediate first part 242 has been fully extended from the outer first part 240 and the second tong segment 212 has been turned about the first tong axis 204, such that the third tong segment 222 is positioned above the mould flange 110, 120.

FIG. 6*d* shows the clamping tong 200 in a clamping position. Relative to the turned position (FIG. 6*c*), the first tong segment 202 has been retracted along the first tong axis 204, such that the third tong segment 222 is overlaying the mould flange 110, 120. In this position, the clamping surface 230 may be repositioned to the clamping state, i.e. by decreasing the distance to the first tong axis 204, to provide a clamping force on the mould flange 110, 120.

Figure 7:
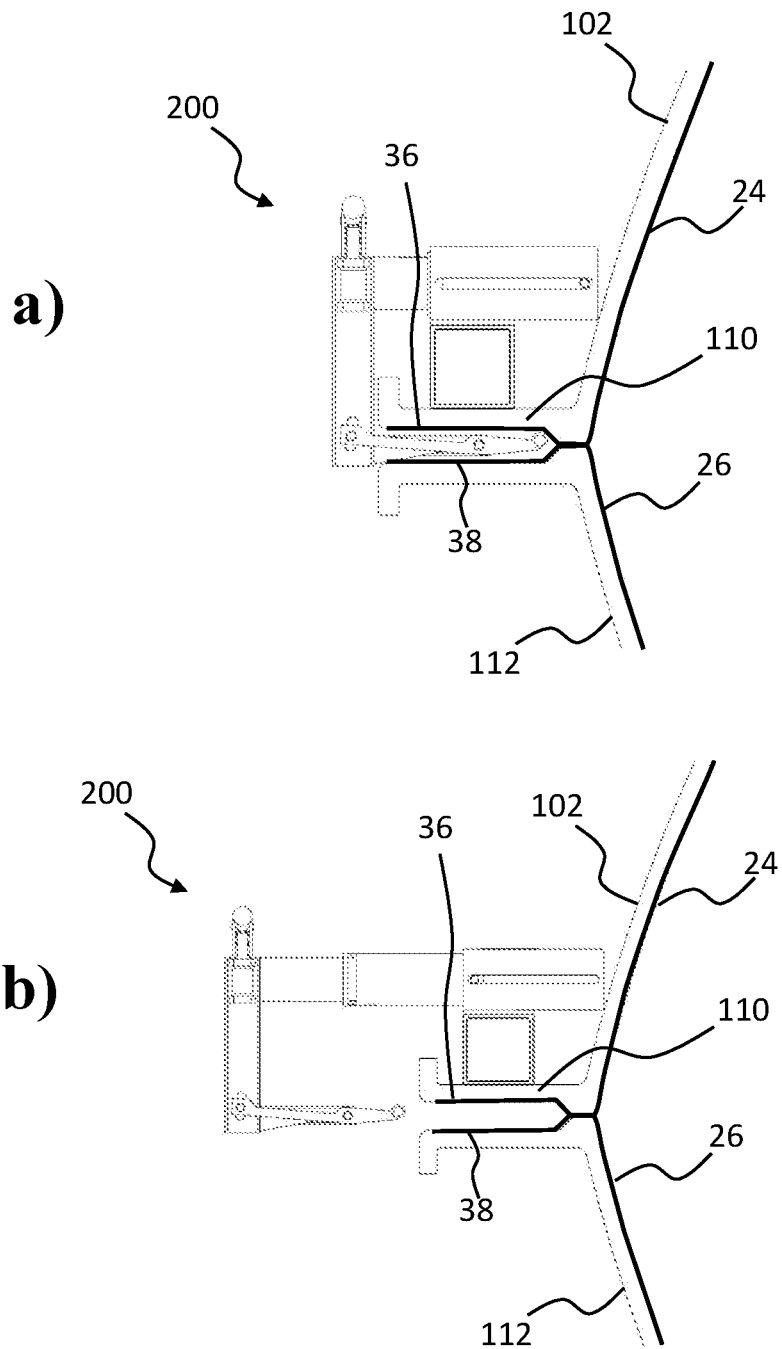
FIG. 7a-b are schematic diagrams illustrating an exemplary clamping tong in a closed mould.

FIG. 7*a-b* are schematic diagrams illustrating an exemplary clamping tong 200 attached to a first mould 102, wherein the first mould 102 has been turned and positioned on a second mould 112. It will be understood that in an alternative example, the clamping tong 200 could have been attached to the second mould 112, and the second mould could have been positioned on the first mould 102.

In the example shown, a first blade shell part 24 is provided in the first mould 102, and a second blade shell part 26 is provided in the second mould 112. The first blade shell part 24 comprises a first shell part flange 36 formed on the first mould flange 110. The second blade shell part 26 comprises a second shell part flange 38 formed on the second mould flange 120.

The clamping tong 200 provides a clamping force on the first shell part flange 36 towards the first mould flange 110, such as to retain the first shell part flange 36 onto the first mould flange 110, and thereby retaining the first shell part 24 in the first mould upon turning the first mould 102 upside-down as shown in FIG. 7*a*.

After having positioned the first mould 102 on top of the second mould 112. The clamping tong may be released and removed, as shown in FIG. 7*b*. Subsequently, e.g. after providing time for curing of the glue between the first blade shell part 24 and the second blade shell part 26, the first mould may be raised.

Figure 8:
FIG. 8a-c are schematic diagrams illustrating exemplary grooves of a clamping tong.
Figure 8:
Figure 8:
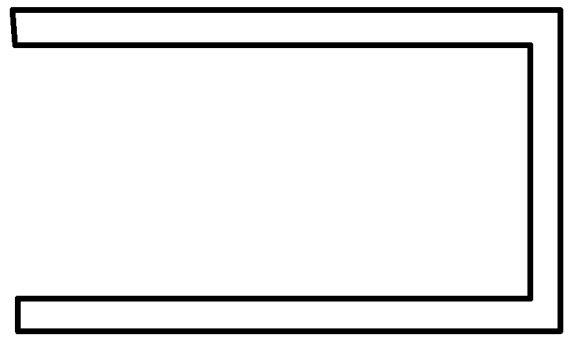

FIG. 8*a-c* are schematic diagrams illustrating exemplary grooves of a clamping tong, such as first parts of a clamping tong.

FIG. 8*a* shows a straight line groove, allowing a linear translational movement, e.g. along the first tong axis.

FIG. 8*b* shows a curved groove, allowing a linear translational movement, e.g. along the first tong axis, in combination with a rotation, e.g. about the first tong axis or an axis parallel to the first tong axis. The curved groove may provide increased strength, e.g. as compared to an L shaped grove.

FIG. 8*c* shows a groove comprising a straight line segment followed by a transverse line segment followed by a straight line segment. Such groove allows a linear translational movement followed by a rotational movement, e.g. 180 deg., followed by a possibility of a linear translational movement in the opposite direction of the first linear translational movement. The linear translational movement may be along the first tong axis, and the rotational movement may be about the first tong axis or an axis parallel to the first tong axis. The grove of FIG. 8*c* provides the possibility of translational movement in two rotational positions, e.g. pointing upwards and pointing downwards. However, rotation is only allowed in the fully extended position.

Figure 9:
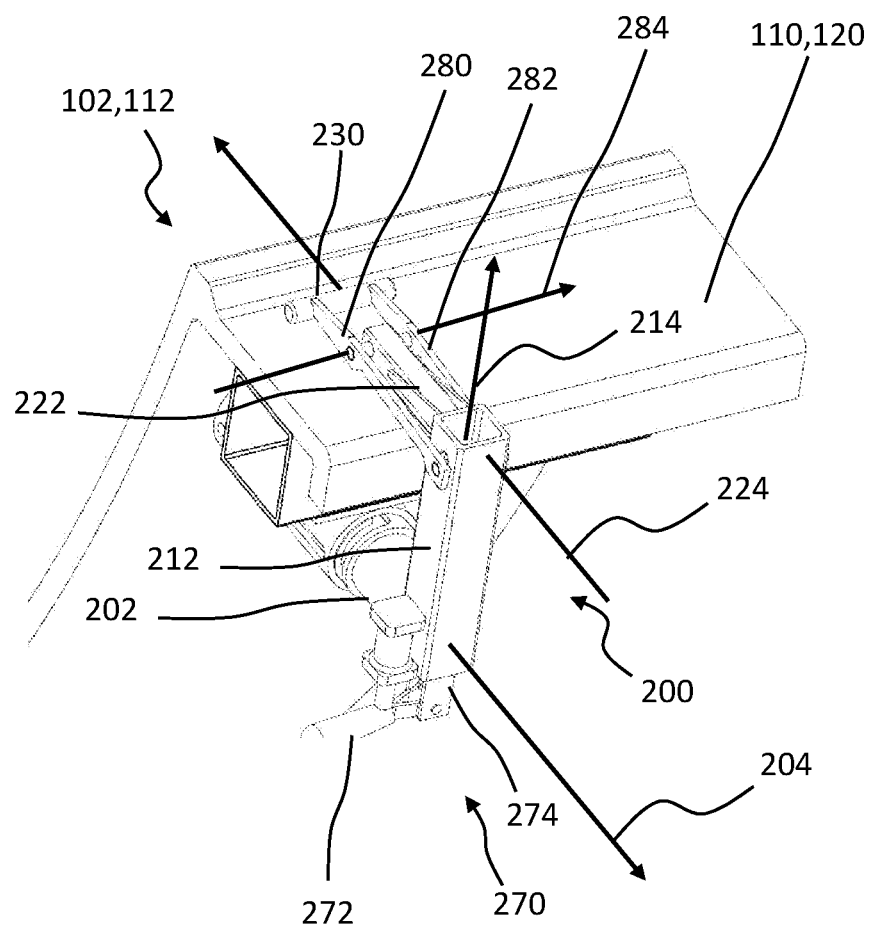
FIG. 9 is a schematic diagram illustrating an exemplary mould with an exemplary clamping tong, FIGS. 10a-b schematically illustrates an exemplary first tong segment of an exemplary clamping tong, FIGS. 11a-d schematically illustrates an exemplary mould with an exemplary clamping tong, FIG. 12 schematically illustrates an exemplary clamping tong.

FIG. 9 is a schematic diagram illustrating an exemplary mould 102, 112 with an exemplary clamping tong 200. In particular, FIG. 9 illustrates a locking mechanism 270 of the clamping tong 200.

The locking mechanism 270 comprises a first locking arm 280 and a second locking arm 282. The first locking arm 280 and the second locking arm 282 are rotatable about a pivot axis 284 perpendicular to the first tong axis 204 and the second tong axis 214, such as to function as a lever arm. The first locking arm 280 and the second locking arm 282 acts on the clamping surface 230 about the pivot axis 284 to translate movement of the first locking arm 280 and the second locking arm 282 along the second tong axis 214 to an opposite movement of the clamping surface 230 along the second tong axis 214. Hence, when the locking arms 280, 282 are moved upwards near the second tong segment 212, e.g. at a movement point of the locking arms 280, 282, the clamping surface 230 is pushed downwards towards the mould flange 110, 120.

The locking mechanism 270 comprises a locking handle 272 configured to be in a locked state or in an unlocked state, e.g. by being positioned to the right or left. The locking handle 272 is connected to the first locking arm 280 and the second locking arm 282, via a shaft 274 extending through the second tong segment 212. The locking handle 272 is connected to the shaft 274 at a first shaft end and the first locking arm 280 and the second locking arm 282 are connected to the shaft 274 at a second shaft end, at opposite sides of the shaft 274.

When the locking handle 272 is shifted from the unlocked state to the locked state the locking handle affects, via the shaft 274, the first locking arm 280 and the second locking arm 282 in a direction along the second tong axis 214, and the first locking arm 280 and the second locking arm 282 acts on the clamping surface 230 to reposition the clamping surface 230 to the clamping state. When the locking handle 272 is shifted from the locked state to the unlocked state the locking handle affects the first locking arm 280 and the second locking arm 282 to allow movement of the first locking arm 280 and the second locking arm 282 in a direction along the second tong axis 214 to allow repositioning of the clamping surface 230 to the release state.

Figure 10:
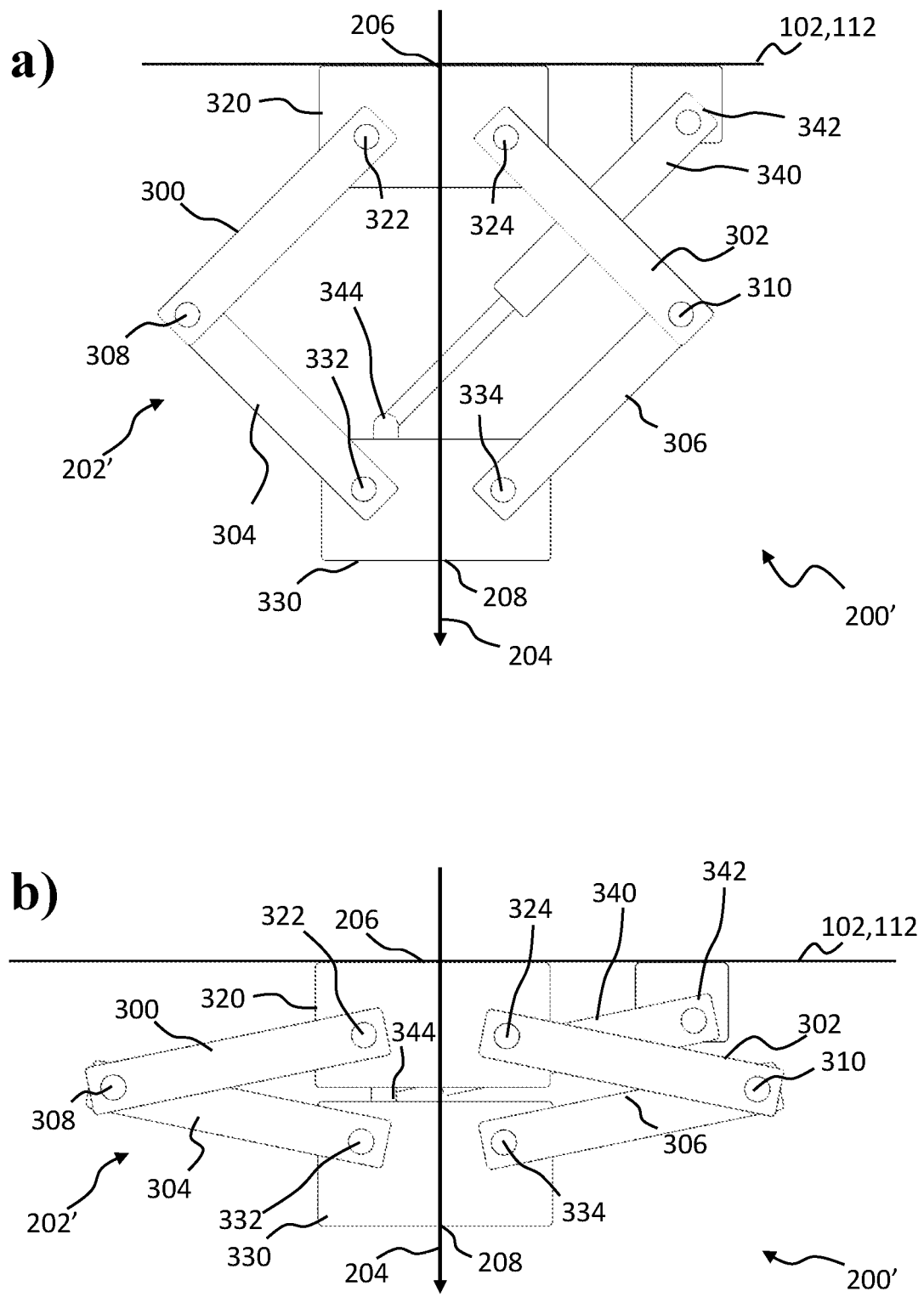

FIGS. 10a and 10b schematically illustrates an exemplary first tong segment 202' of an exemplary clamping tong 200'. The first tong segment 202' may replace the first tong segment 202 of the clamping tong 200 of the previous figures. As compared to the first tong segment 202 of the previous figures, the first tong segment 202' of FIGS. 10a and 10b provides for adjustment along the first tong axis 204 between a first retracted state and a first extended state by a scissor mechanism instead of a telescopic mechanism. The first tong segment 202' is adjustable along the first tong axis 204 between a first retracted state, as illustrated in FIG. 10b, and a first extended state, as illustrated in FIG. 10a.

The first tong segment 202' extends along the first tong axis 204. The first tong segment 202' extends from a first primary end 206 to a first secondary end 208. The first tong segment 202' may comprise a plurality of parts, such as two parts, or three parts, or four parts as shown. In the illustrated example, the first tong segment 202' comprises a primary proximal first part 300, a secondary proximal first part 302, a primary distal first part 304, and a secondary distal first part 306. The primary proximal first part 300 and the secondary proximal first part 302 extends from the first primary end 206. The primary distal first part 304 and the secondary distal first part 306 extends to the first secondary end 208.

The primary proximal first part 300 and the primary distal first part 304 are rotationally coupled to allow a rotation of the primary proximal first part 300 relative to the primary distal first part 304 about a primary axis 308. The primary axis 308 is perpendicular to the first tong axis 204. The secondary proximal first part 302 and the secondary distal first part 306 are rotationally coupled to allow a rotation of the secondary proximal first part 302 relative to the secondary distal first part 306 about a secondary axis 310. The secondary axis 310 is perpendicular to the first tong axis 204. The secondary axis 310 may be parallel to the primary axis 308, as illustrated.

The primary proximal first part 300 and the secondary proximal first part 302 are coupled to the mould 102, 112 via a mould connection 320. The mould connection 320 allows for rotation of the primary proximal first part 300 relative to the mould 102 112 about a primary proximal axis 322, e.g. parallel to the primary axis 308. The mould connection 320 allows for rotation of the secondary proximal first part 302 relative to the mould 102 112 about a secondary proximal axis 324, e.g. parallel to the secondary axis 310.

The primary distal first part 304 and the secondary distal first part 306 are coupled to the second tong segment (not shown) via a distal connection 330. The distal connection 330 allows for rotation of the primary distal first part 304 relative to the second tong segment about a primary distal axis 332, e.g. parallel to the primary axis 308. The distal connection 330 allows for rotation of the secondary distal first part 306 relative to the second tong segment about a secondary distal axis 334, e.g. parallel to the secondary axis 310.

The clamping tong 200' may comprise a repositioning actuator 340, as illustrated in FIGS. 10a and 10b. The repositioning actuator 340 may form part of the first tong segment 202'. The repositioning actuator 340 has a first repositioning actuator end 342 and a second repositioning actuator end 344. The first repositioning actuator end 342 is attached to the mould 102, 112. The second repositioning actuator end 344 is attached to the first secondary end of the first tong segment, e.g. via the distal connection 330. Alternatively, the second repositioning actuator end 344 could be attached to the second tong segment.

The repositioning actuator 340 in a retracted repositioning actuator state, e.g. as illustrated in FIG. 10b, has a retracted length between the first repositioning actuator end 342 and the second repositioning actuator end 344. The repositioning actuator 340 in an extended repositioning actuator state, e.g. as illustrated in FIG. 10a, has an extended length between the first repositioning actuator end 342 and the second repositioning actuator end 344. As illustrated, the extended length is longer than the retracted length.

The repositioning actuator 340 is configured to adjust the first tong segment 202' along the first tong axis 204 between the first retracted state (FIG. 10b) and the first extended state (FIG. 10a). For example, the repositioning actuator 340 is configured to position the first tong segment 202' in the first extended state (FIG. 10a) by attaining the extended repositioning actuator state, e.g. by extension of the repositioning actuator 340. Additionally or alternatively, the repositioning actuator 340 may be configured to position the first tong segment 202' in the first retracted state (FIG. 10b) by attaining the retracted repositioning actuator state, e.g. by retraction of the repositioning actuator 340.

In alternative embodiments, the repositioning actuator 340 could be positioned between other elements, such that retraction of the repositioning actuator 340 would result in extension of the first tong segment 202', and extension of the repositioning actuator 340 would result in retraction of the first tong segment 202'.

As illustrated, the repositioning actuator 340 is a pneumatic piston. Alternatively, the repositioning actuator could be an electromechanical actuator, such as a linear actuator.

The repositioning actuator 340 may be configured to attain the extended repositioning actuator state upon receipt of a first repositioning actuator input, such as a positive pressure, and/or a pressure, e.g. a positive pressure, at a first input port. Alternatively or additionally, the repositioning actuator 340 may be configured to attain the retracted repositioning actuator state upon receipt of a second repositioning actuator input, such as a negative pressure, and/or a pressure, e.g. a positive pressure, at a second input port. Thus, the repositioning actuator 340 may be single acting or dual acting.

FIGS. 11a-11d schematically illustrates an exemplary mould 102, 112 with an exemplary clamping tong 200'. The mould 102, 112 may be a first mould 102 and/or a second mould 112 of a mould system, such as a mould system as shown in previous figures. The clamping tong 200' may be a primary clamping tong being distributed along at least a part of the first mould flange 110 of the first mould 102 and/or the clamping tong 200' may be a secondary clamping tong being distributed along at least a part of the second mould flange 120 of the second mould 112.

The clamping tong 200' comprises a first tong segment 202'. The first tong segment 202' extends along a first tong axis 204. The first tong segment 202' extends from a first primary end 206 to a first secondary end 208. The first tong segment 202' comprises a plurality of parts, such as a primary proximal first part 300, a secondary proximal first part 302, a primary distal first part 304, and a secondary distal first part 306, as further described and illustrated in relation to FIGS. 10a and 10b. The primary proximal first part 300 and the secondary proximal first part 302 extends from the first primary end 206. The primary distal first part 304 and the secondary distal first part 306 extends to the first secondary end 208.

The clamping tong 200' comprises a repositioning actuator 340, e.g. as further described in relation to FIGS. 10a and 10b. The repositioning actuator 340 is configured to adjust the first tong segment 202' along the first tong axis 204 between a first retracted state and a first extended state.

The clamping tong 200' comprises a second tong segment 212. The second tong segment 212 extends along a second tong axis 214. The second tong segment 212 extends from a second primary end 216 to a second secondary end 218. The second tong segment 212 is attached at the second primary end 216 to the first secondary end 208 of the first tong segment 202'.

The clamping tong 200' comprises a third tong segment 222. The third tong segment 222 extends along a third tong axis 224. The third tong segment 222 extends from a third primary end 226 to a third secondary end 228. The third tong segment 222 is attached at the third primary end 226 to the second secondary end 218 of the second tong segment 212.

The clamping tong 200' has a clamping surface 230. The third tong segment 222 may comprise the clamping surface 230. The clamping surface 230, here shown as a cylinder-shaped element, is configured for applying a clamping force on a mould section, such as a mould flange 110, 120. The clamping tong 200' is configured to reposition the clamping surface 230 between a clamping state and a release state, such that in the clamping state the distance between the clamping surface 230 and the first tong axis 204 is decreased as compared to the distance in the release state.

The clamping tong 200' is attached, such as fixedly attached, to the mould 102, 112, such as to a frame structure of the mould 102, 112. The clamping tong 200 may be attached to the mould 102, 112 by the first tong segment 202' being attached, such as fixedly attached, to the mould 102, 112, such as the primary proximal first part 300 and/or the secondary proximal first part 302 of the first tong segment 202' being attached, such as fixedly attached, to the mould 102, 112.

The clamping tong 200' may be welded to the mould 102, 112, such as welded to the frame structure of the mould 102, 112. Alternatively, the clamping tong 200' may be attached to the mould 102, 112 and/or the frame structure by use of bolts or other fastening means.

The second tong segment 212 and/or the third tong segment 224 is rotatable about the second tong axis 214 or an axis 352 parallel to the second tong axis 214. For example, the clamping tong 202' may comprise a second rotational joint 350, as illustrated. The second rotational joint 350 is provided between the first tong segment 204' and the second tong segment 212. The second rotational joint 350 allows rotation of the second tong segment 212 and the third tong segment 224 about the axis 352 parallel to the second tong axis 214.

The second tong segment 212 is rotatable about the first tong axis 204, such that the second tong segment 212 may point upwards or downwards. The rotation about the first tong axis 204 may be provided by a rotational joint, such as a first rotational joint between the second rotational joint 350 and the first tong segment 202'. Alternatively, the first rotational joint may be provided between the second rotational joint 350 and the second tong segment 212.

FIG. 11a-d are schematic diagrams illustrating the exemplary clamping tong 200' in various positions.

Figure 11:
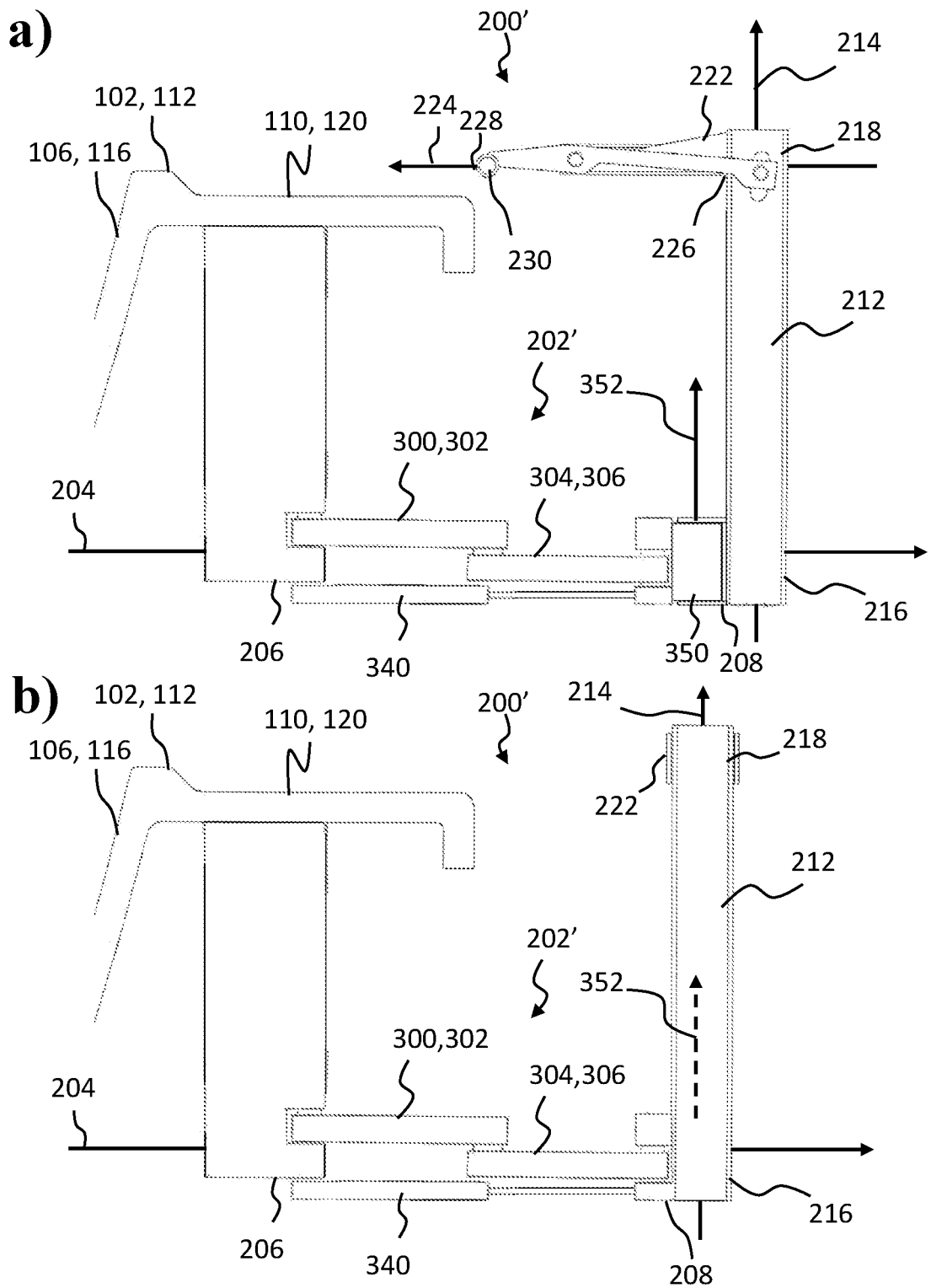
Figure 11:
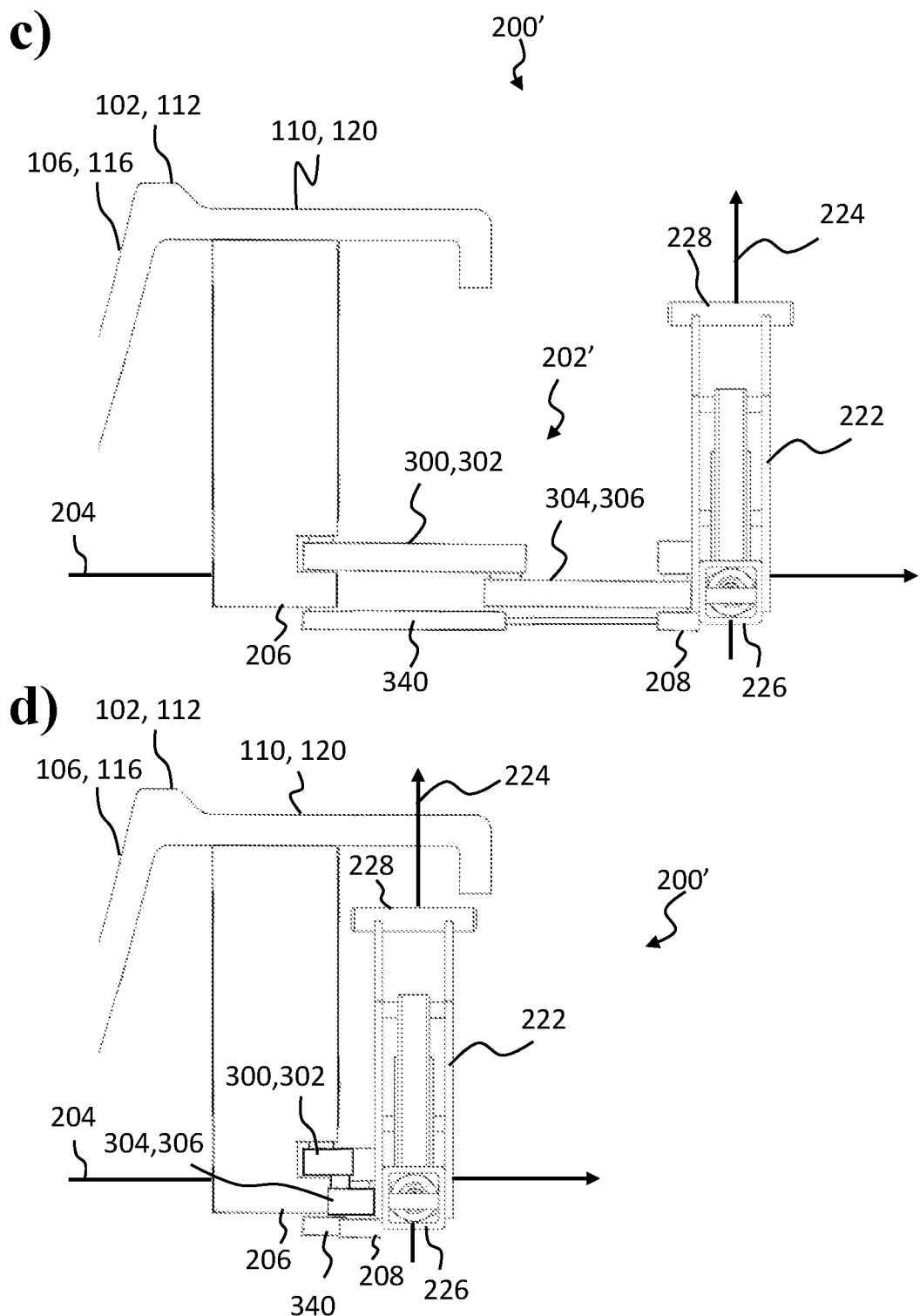

FIG. 11a shows the clamping tong 200' in a fully extended position. From this position, the clamping tong 200' may be repositioned, e.g. pushed, towards the mould 102, 112, such as to position the clamping tong 200' in the position to apply a clamping force to the mould flange 110, 120. Alternatively, the clamping tong 200' may be repositioned to a storing position, such as a position wherein the clamping tong 200 is retained underneath the mould flange 110, 120.

FIG. 11b shows the clamping tong 200' in a fully extended position, and wherein the second tong segment 212 and the third tong segment 222, relative to the position shown in FIG. 11a, have been turned about the axis 352 parallel to the second tong axis 214, such that the third tong segment 222 extends substantially parallel to a longitudinal direction of the mould 102,112.

FIG. 11c shows the clamping tong 200' in a fully extended position, and wherein the second tong segment 212 and the third tong segment 222, relative to the position shown in FIG. 11b, have been turned about the first tong axis 204, such that the third tong segment 222 extends substantially upwards and the second tong segment 212 extends substantially parallel to a longitudinal direction of the mould 102,112.

FIG. 11d shows the clamping tong 200' in a storing position, such as a position wherein the clamping tong 200 is retained underneath the mould flange 110, 120. In the storing position the clamping tong 200 is positioned on the non-moulding side 108, 118, such as on the non-moulding side 108, 118 of the mould flange 110, 120. In the storing position the clamping tong 200 is positioned such that the clamping tong 200 does not extend beyond the periphery of the mould flange 110, 120. Relative to the position as shown in FIG. 11c, the clamping tong 200' has been repositioned along the first tong axis 204, such as to shorten the distance between the first primary end 206 and the first secondary end 208. The repositioning between the position shown in FIG. 11c and the position shown in FIG. 11d may be provided by the repositioning actuator 340. The repositioning actuator 340 may additionally or alternatively be configured to provide for an opposite repositioning, e.g. from the position shown in FIG. 11d to the position shown in FIG. 11c.

Figure 12:
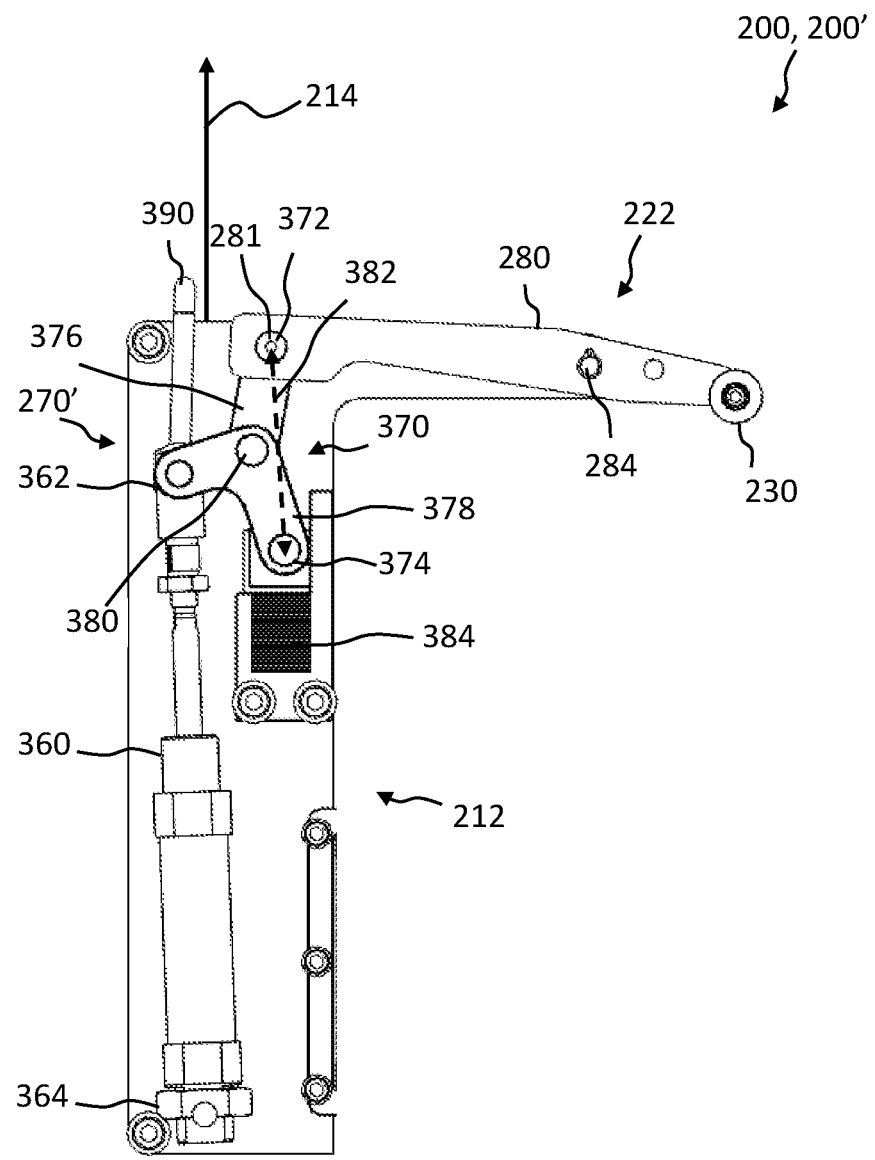

FIG. 12 schematically illustrates an exemplary clamping tong 200, 200', such as a clamping tong as illustrated in relation to the previous figures. In particular, FIG. 12 schematically illustrates a locking mechanism 270' of the clamping tong 200, 200'. The locking mechanism 270' is configured for positioning and locking the clamping surface 230 in the clamping state. The locking mechanism may be housed inside the second tong segment 212 and third tong segment 222, as illustrated.

The locking mechanism 270' comprises a fastening actuator 360. The fastening actuator 360 has a first fastening actuator end 362 and a second fastening actuator end 364. The fastening actuator 360 in a retracted fastening actuator state has a retracted length between the first fastening actuator end 362 and the second fastening actuator end 362. The fastening actuator 360 in an extended fastening actuator state has an extended length between the first fastening actuator end 362 and the second fastening actuator end 364. The extended length is longer than the retracted length. The fastening actuator is configured to adjust the clamping surface 230, such as to position the clamping surface 230 in the clamping state and/or release state.

For example, the fastening actuator 360 is configured to position the clamping surface 230 in the clamping state by attaining the extended fastening actuator state, e.g. by extension of the fastening actuator 360. Alternatively or additionally, the fastening actuator 360 is configured to position the clamping surface 230 in the release state by attaining the retracted fastening actuator state, e.g. by retraction of the fastening actuator 360.

As illustrated, the fastening actuator 360 is a pneumatic piston. Alternatively, the fastening actuator 360 could be an electromechanical actuator, such as a linear actuator.

The fastening actuator 360 may be configured to attain the extended fastening actuator state upon receipt of a first fastening actuator input, such as a positive pressure, and/or a pressure, e.g. a positive pressure, at a first input port. Alternatively or additionally, the fastening actuator 360 may be configured to attain the retracted fastening actuator state upon receipt of a second fastening actuator input, such as a negative pressure, and/or a pressure, e.g. a positive pressure, at a second input port. Thus, the fastening actuator 360 may be dual acting.

The locking mechanism 270' comprises a knee joint element 370. The knee joint element 370 extends from a first knee joint end 372 to a second knee joint end 374. The knee joint element 370 comprises a first knee joint part 376 having the first knee joint end 372. The knee joint element 370 comprises a second knee joint part 378 having the second knee joint end 374. The first knee joint part 376 and the second knee joint part 378 are hingedly connected at a knee joint coupling point 380 to allow relative rotation between the first knee joint part 376 and the second knee joint part 378 about a knee joint axis.

The knee joint element 370 has a knee joint length 382 from the first knee joint end 372 to the second knee joint end 374. The knee joint element 370 is adjustable between a first knee joint state and a second knee joint state. In the first knee joint state, wherein the knee joint coupling point 380 is moved to the left, the knee joint length 382 is a first knee joint length. In the second knee joint state, wherein the knee joint coupling point 380 is translated to the right, the knee joint length is a second knee joint length. The second knee joint length is longer than the first knee joint length. Furthermore, in an intermediate knee joint state between the first knee joint state and the second knee joint state, e.g. wherein the knee joint coupling point 380 is aligned along a line between the first knee joint end 372 and the second knee joint end 374, the knee joint length is a maximum knee joint length. The maximum knee joint length is longer than the first knee joint length and the second knee joint length.

The locking mechanism comprises a spring element 384. The spring element 384 provides a spring force to the second knee joint end 374 towards the first knee joint end 372. The spring element 384 may be composed of a plurality of disc springs.

The knee joint element 370 is coupled to the clamping surface 230 such that the clamping surface 230 is in the clamping state when the knee joint element 270 is in the second knee joint state and the clamping surface 230 is in the release state when the knee joint element 270 is in the first knee joint state.

The locking mechanism comprises a first locking arm 280. The first locking arm 280 is rotatable about a pivot axis 284. The first locking arm 280 acts on the clamping surface 230 about the pivot axis to translate movement of a movement point 281 of the first locking arm 280 along the second tong axis 214 to an opposite movement of the clamping surface along the second tong axis 214. The first knee joint end 372 of the knee joint element 370 is connected to the movement point 281 of the first locking arm 280.

Thus, when the knee joint element 370 is in the second knee joint state, wherein the knee joint length 382 is longer than in the first knee joint state, the movement point 281 of the locking arm 280 is in a more upwards position relative to the knee joint element 370 being in the first knee joint state. Thereby the clamping surface 230 is in a more downward position relative to the knee joint element 370 being in the first knee joint state, and the clamping surface 230 is in the clamping state. Translating the knee joint element 370 to the first knee joint state will decrease the knee joint length 382 and bring the clamping surface 230 to the release state.

The first knee joint state and the second knee joint state being on opposite sides of the intermediate knee joint state, provides that a force counteracting the spring force from the spring element 384 is needed in order to change the knee joint state between the first knee joint state and the second knee joint state. Thereby, the clamping tong 200, 200' may remain in the release state and/or the clamping state in the absence of a force configured to change between the states.

The first fastening actuator end 362 is attached to the knee joint coupling point 380. Thereby, the fastening actuator 360 is configured to position the knee joint element 370 in the first knee joint state and/or the second knee joint state. For example, in the illustrated example, the fastening actuator 360 is configured to position the knee joint element 370 in the second knee joint state by attaining the extended fastening actuator state. Furthermore, the fastening actuator 360 is configured to position the knee joint element 370 in the first knee joint state by attaining the retracted fastening actuator state.

The clamping tong 200, 200' may optionally comprise an indicator, such as a visual indicator 390, the visual indicator, as illustrated. The visual indicator 390 may be configured to indicate the state of the clamping tong 200, 200', e.g. whether the clamping surface is in the clamping state and/or in the release state. The visual indicator 390 may be provided by being provided on an elongated member extending from the first fastening actuator end 362, and being adapted such that it is visible when the fastening actuator 360 is in the extended state, and hidden when the fastening actuator 360 is in the retracted state. The visual indicator 390 may provide an operator to recognize the state of the clamping tong 200, 200' from a distance.

Figure 13:
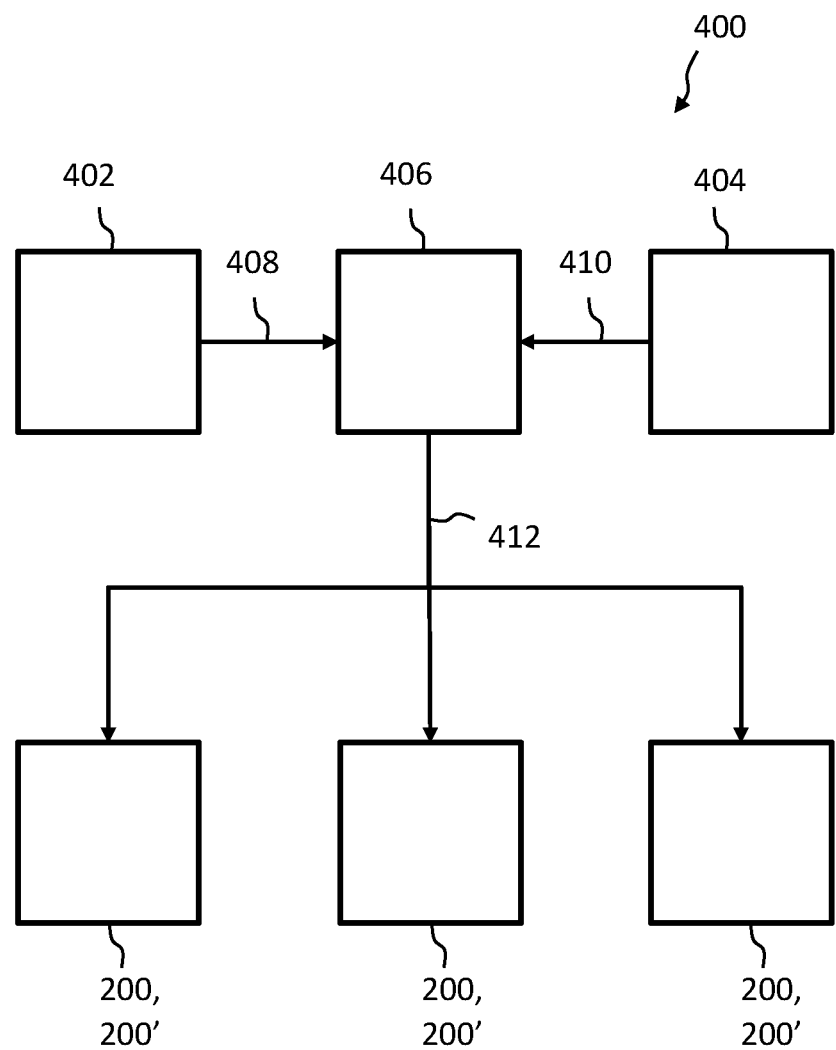
FIG. 13 is a block diagram of an exemplary control system.

FIG. 13 is a block diagram of an exemplary control system 400 for controlling repositioning of the clamping surface of one or more clamping tongs 200, 200', e.g. as described in relation to the previous figures. The control system 400 is configured to control repositioning of the clamping surfaces of the one or more clamping tongs 200, 200', between a clamping state and a release state.

The control system 400 comprises a first control input location 402 located at a first location. The control system 400 comprises a second control input location 404 located at a second location. The first control input location 402 and the second control input location 404 are located such that they cannot be reached simultaneously by a single operator. Thus, the first control input location 402 and the second control input location 404 may be separated by at least 5 meters, such as at least 10 meters such as at least 20 meters, such as at least 50 meters.

The control system 400 is configured to reposition the clamping surface to a clamping state of each clamping tong 200, 200', upon simultaneously receiving a clamping state input from the first control input location 402 and the second control input location 404. Additionally, the control system 400 is configured to reposition the clamping surface to a release state of each clamping tong 200, 200' upon simultaneously receiving a release state input from the first control input location 402 and the second control input location 404.

For example the control system 400 may comprise a determiner 406. The determiner 406 receives a first control input 408 from the first control input location 402. The determiner 406 receives a second control input 410 from the second control input location 404. The determiner determines whether the first control input 408 corresponds to the second control input 410. If the first control input 408 corresponds to the second control input 410, the determiner provides a control output 412 to each clamping tong 200, 200', wherein the control output 412 is corresponding to the first control input 408 and the second control input 410. If the first control input 408 does not correspond to the second control input 410, the determiner forego providing a control output 412 to each clamping tong 200, 200', and/or maintains a previously issued control output. The control output 412 may be a pressure, such as a pressure on a specific pressure port.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
blade
14 blade tip
16 blade root
18 leading edge
trailing edge
24 first blade shell part
26 second blade shell part
28 bond lines/glue joints
30 root region
32 transition region
34 airfoil region
36 first shell part flange
38 second shell part flange
100 mould system
102 first mould
103 first mould frame structure
104 first moulding side
106 first moulding surface
108 first non-moulding side
110 first mould flange
112 second mould
113 first mould frame structure
114 second moulding side
116 second moulding surface
118 second non-moulding side
120 second mould flange
130 positioning device
200 clamping tong
202 first tong segment
204 first tong axis
206 first primary end
208 first secondary end
212 second tong segment
214 second tong axis
216 second primary end
218 second secondary end
222 third tong segment
224 third tong axis
226 third primary end
228 third secondary end
230 clamping surface
240 proximal first part/outer first part
242 intermediate first part
244 distal first part/inner first part
246 first outer groove
248 first intermediate pin
250 first intermediate groove
252 first inner pin
270 locking mechanism
272 locking handle
274 shaft
280 first locking arm
281 movement point of first locking arm
282 second locking arm
282 movement point of second locking arm
284 pivot axis
300 primary proximal first part
302 secondary proximal first part
304 primary distal first part
306 secondary distal first part
308 primary axis
310 secondary axis
320 mould connection
322 primary proximal axis
324 secondary proximal axis
330 distal connection
332 primary distal axis
334 secondary distal axis
340 repositioning actuator
342 first repositioning actuator end
344 second repositioning actuator end
350 second rotational joint
352 axis parallel to the second tong axis
360 fastening actuator
362 first fastening actuator end
364 second fastening actuator end
370 knee joint element
372 first knee joint end
374 second knee joint end
376 first knee joint part
378 second knee joint part
380 knee joint coupling point
382 knee joint length
384 spring element
390 indicator
400 control system
402 first control input location
404 second control input location
406 determiner
408 first control input
410 second control input
412 control output.

The invention claimed is:

1. A clamping tong for securing a shell part of a wind turbine blade in a mould for moulding the shell part, the clamping tong comprising:
   a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment, wherein the second tong segment is rotatable about the first tong axis or an axis parallel to the first tong axis;

a third tong segment extending from a third primary end to a third secondary end, the third tong segment being attached at the third primary end to the second secondary end of the second tong segment, the third tong segment having a clamping surface configured for applying a clamping force on a mould section; and a locking mechanism for positioning and/or locking the clamping surface in the clamping state, wherein the locking mechanism comprises a fastening actuator having a first fastening actuator end and a second fastening actuator end, wherein the fastening actuator in a retracted fastening actuator state has a retracted length between the first fastening actuator end and the second fastening actuator end, wherein the fastening actuator in an extended fastening actuator state has an extended length between the first fastening actuator end and the second fastening actuator end, the extended length being longer than the retracted length, wherein the fastening actuator is configured to adjust the distance between the clamping surface and the first tong axis so as to position the clamping surface in a clamping state and/or a release state, and wherein the fastening actuator comprises a pneumatic piston, wherein the clamping tong is configured to reposition the clamping surface between the clamping state and the release state, wherein the distance between the clamping surface and the first tong axis in the clamping state is shorter than the distance between the clamping surface and the first tong axis in the release state, and wherein the first tong segment is fixedly attachable to the mould.

2. The clamping tong according to claim 1, wherein the first tong segment comprises a rotational joint to allow rotation about the first tong axis between the first primary end and the first secondary end.

3. The clamping tong according to claim 1, wherein the first tong segment comprises a proximal first part and a distal first part, the proximal first part extending from the first primary end and the distal first part extending to the first secondary end, the distal first part being slidable along the first tong axis relative to the proximal first part.

4. The clamping tong according to claim 3, wherein the distal first part is rotatable relative to the proximal first part about the first tong axis.

5. The clamping tong according to claim 3, wherein the first tong segment comprises an intermediate first part, the intermediate first part extending inside the proximal first part, the distal first part extending inside the intermediate first part, the intermediate first part being slidable along the first tong axis relative to the proximal first part and the distal first part being slidable along the first tong axis relative to the intermediate first part.

6. The clamping tong according to claim 5, wherein the proximal first part comprises a first outer groove, the intermediate first part comprising a first intermediate pin in engagement with the first outer grove, the first outer groove defining a path of movement of the intermediate first part relative to the proximal first part.

7. The clamping tong according to claim 5, wherein the intermediate first part comprises a first intermediate groove, the distal first part comprising a first inner pin in engagement with the first intermediate grove, the first intermediate groove defining a path of movement of the distal first part relative to the intermediate first part.

8. The clamping tong according to claim 3, wherein the proximal first part comprises a first outer groove, the distal first part comprising a first inner pin in engagement with the first outer grove, the first outer groove defining a path of movement of the distal first part relative to the proximal first part.

9. The clamping tong according to claim 1, wherein the second tong segment is rigidly attached to the first tong segment and the third tong segment is rigidly attached to the second tong segment.

10. The clamping tong according to claim 1, wherein the second tong segment and/or the third tong segment is rotatable about the second tong axis or an axis parallel to the second tong axis.

11. The clamping tong according to claim 1, wherein the first tong segment comprises a primary proximal first part, a secondary proximal first part, a primary distal first part, and a secondary distal first part, the primary proximal first part and the secondary proximal first part extending from the first primary end and the primary distal first part and the secondary distal first part extending to the first secondary end, the primary proximal first part and the primary distal first part being rotationally coupled to allow a rotation of the primary proximal first part relative to the primary distal first part about a primary axis perpendicular to the first tong axis, and the secondary proximal first part and the secondary distal first part being rotationally coupled to allow a rotation of the secondary proximal first part relative to the secondary distal first part about a secondary axis perpendicular to the first tong axis.

12. The clamping tong according to claim 1, comprising a repositioning actuator having a first repositioning actuator end and a second repositioning actuator end, the repositioning actuator in a retracted repositioning actuator state has a retracted length between the first repositioning actuator end and the second repositioning actuator end and in an extended repositioning actuator state has an extended length between the first repositioning actuator end and the second repositioning actuator end, the extended length being longer than the retracted length, wherein the repositioning actuator is configured to adjust the first tong segment along the first tong axis between the first retracted state and the first extended state.

13. The clamping tong according to claim 1, wherein the fastening actuator is configured to position the clamping surface in the clamping state by attaining the extended fastening actuator state.

14. The clamping tong according to claim 1, wherein the fastening actuator is configured to position the clamping surface in the release state by attaining the retracted fastening actuator state.

15. The clamping tong according to claim 1, wherein the fastening actuator is configured to attain the extended fastening actuator state upon receipt of a first fastening actuator input.

16. The clamping tong according to claim 1, wherein the fastening actuator is configured to attain the retracted fastening actuator state upon receipt of a second fastening actuator input.

17. The clamping tong according to claim 1, wherein the locking mechanism comprises a knee joint element extending from a first knee joint end to a second knee joint end, wherein the knee joint element comprises a first knee joint part having the first knee joint end and a second knee joint part having the second knee joint end, the first knee joint part and the second knee joint part being hingedly connected at a knee joint coupling point to allow relative rotation between the first knee joint part and the second knee joint part about a knee joint axis, the knee joint element having a knee joint length from the first knee joint end to the second knee joint end, wherein the knee joint element is adjustable between a first knee joint state and a second knee joint state, wherein in the first knee joint state the knee joint length being a first knee joint length, and wherein in the second knee joint state the knee joint length being a second knee joint length, the second knee joint length being longer than the first knee joint length, wherein in an intermediate knee joint state between the first knee joint state and the second knee joint state the knee joint length being a maximum knee joint length, the maximum knee joint length being longer than the first knee joint length and the second knee joint length, and wherein the knee joint element is coupled to the clamping surface such that the clamping surface is in the clamping state when the knee joint element is in the second knee joint state and the clamping surface is in the release state when the knee joint element is in the first knee joint state.

18. The clamping tong according to claim 1, wherein the locking mechanism comprises a first locking arm being rotatable about a pivot axis, the first locking arm acting on the clamping surface about the pivot axis to translate movement of a movement point of the first locking arm along the second tong axis to an opposite movement of the clamping surface along the second tong axis.

19. The clamping tong according to claim 18, wherein the locking mechanism comprises a knee joint element extending from a first knee joint end to a second knee joint end, wherein the knee joint element comprises a first knee joint part having the first knee joint end and a second knee joint part having the second knee joint end, the first knee joint part and the second knee joint part being hingedly connected at a knee joint coupling point to allow relative rotation between the first knee joint part and the second knee joint part about a knee joint axis, the knee joint element having a knee joint length from the first knee joint end to the second knee joint end, wherein the knee joint element is adjustable between a first knee joint state and a second knee joint state, wherein in the first knee joint state the knee joint length being a first knee joint length, and wherein in the second knee joint state the knee joint length being a second knee joint length, the second knee joint length being longer than the first knee joint length, wherein in an intermediate knee joint state between the first knee joint state and the second knee joint state the knee joint length being a maximum knee joint length, the maximum knee joint length being longer than the first knee joint length and the second knee joint length wherein the knee joint element is coupled to the clamping surface such that the clamping surface is in the clamping state when the knee joint element is in the second knee joint state and the clamping surface is in the release state when the knee joint element is in the first knee joint state, and wherein the first knee joint end of the knee joint element is connected to the movement point of the first locking arm.

20. The clamping tong according to claim 1, comprising a visual indicator, the visual indicator being configured to indicate the clamping surface being in the clamping state and/or being configured to indicate the clamping surface being in the release state.

21. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment; and a third tong segment extending from a third primary end to a third secondary end, the third tong segment being attached at the third primary end to the second secondary end of the second tong segment, the third tong segment having a clamping surface for applying a clamping force on a mould section, wherein the clamping tong is configured to reposition the clamping surface between a clamping state and a release state, wherein the distance between the clamping surface and the first tong axis in the clamping state is shorter than the distance between the clamping surface and the first tong axis in the release state, wherein the first tong segment is attachable to the mould, and wherein the first tong segment comprises a primary proximal first part, a secondary proximal first part, a primary distal first part, and a secondary distal first part, the primary proximal first part and the secondary proximal first part extending from the first primary end and the primary distal first part and the secondary distal first part extending to the first secondary end, the primary proximal first part and the primary distal first part being rotationally coupled to allow a rotation of the primary proximal first part relative to the primary distal first part about a primary axis perpendicular to the first tong axis, and the secondary proximal first part and the secondary distal first part being rotationally coupled to allow a rotation of the secondary proximal first part relative to the secondary distal first part about a secondary axis perpendicular to the first tong axis.

22. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment;

a third tong segment extending from a third primary end to a third secondary end, the third tong segment being attached at the third primary end to the second secondary end of the second tong segment, the third tong segment having a clamping surface for applying a clamping force on a mould section; and a repositioning actuator having a first repositioning actuator end and a second repositioning actuator end, the repositioning actuator in a retracted repositioning actuator state has a retracted length between the first repositioning actuator end and the second repositioning actuator end and in an extended repositioning actuator state has an extended length between the first repositioning actuator end and the second repositioning actuator end, the extended length being longer than the retracted length, wherein the clamping tong is configured to reposition the clamping surface between a clamping state and a release state, wherein the distance between the clamping surface and the first tong axis in the clamping state is shorter than the distance between the clamping surface and the first tong axis in the release state, wherein the first tong segment is attachable to the mould, and wherein the repositioning actuator is configured to adjust the first tong segment along the first tong axis between the first retracted state and the first extended state.

23. The clamping tong according to claim 22, wherein the repositioning actuator is configured to position the first tong segment in the first extended state by attaining the extended repositioning actuator state.

24. The clamping tong according to claim 22, wherein the repositioning actuator is configured to position the first tong segment in the first retracted state by attaining the retracted repositioning actuator state.

25. The clamping tong according to claim 22, wherein the repositioning actuator is a pneumatic piston.

26. The clamping tong according to claim 22, wherein the repositioning actuator is configured to attain the extended repositioning actuator state upon receipt of a first repositioning actuator input.

27. The clamping tong according to claim 22, wherein the repositioning actuator is configured to attain the retracted repositioning actuator state upon receipt of a second repositioning actuator input.

28. The clamping tong according to claim 22, wherein the first repositioning actuator end is attachable to the mould and the second repositioning actuator end is attached to the first secondary end of the first tong segment or the second tong segment.

29. A mould system for moulding a blade shell of a wind turbine blade, the mould system comprising:

a first mould for manufacturing a first blade shell part of the wind turbine blade and a second mould for moulding a second blade shell part of the wind turbine blade, wherein the first mould has a first moulding side with a first moulding surface that defines an outer shape of the first blade shell part and a first non-moulding side opposite the first moulding side, wherein the second mould has a second moulding side with a second moulding surface that defines an outer shape of the second blade shell part and having a second non-moulding side opposite the second moulding side, wherein the mould system is configured to position the first mould and the second mould such that the first moulding side is facing the second moulding side and such that the first blade shell part may be glued to the second blade shell part so as to form the blade shell of the wind turbine blade, wherein the first mould comprises a first mould flange along at least a part of the periphery of the first moulding surface, the first mould flange being configured to provide a first shell part flange on the first blade shell part, wherein the first mould comprises a plurality of primary clamping tongs being distributed along at least a part of the first mould flange, where each of the primary clamping tongs comprises the clamping tong according to claim 22, wherein the first tong segment of each of the primary clamping tongs of the plurality of primary clamping tongs is fixedly connected to the first non-moulding side of the first mould.

30. The mould system according to claim 29, wherein the first tong axis is parallel to the first mould flange.

31. The mould system according to claim 29, wherein each primary clamping tong of the plurality of primary clamping tongs is configured to be in a storing position wherein the primary clamping tong is positioned on the non-moulding side of the first mould flange and wherein the primary clamping tong does not extend beyond the periphery of the first mould flange.

32. The mould system according to claim 29, wherein the mould system is configured to rotate and position the first mould on top of the second mould, such that the first moulding side is facing the second moulding side.

33. The mould system according to claim 29, comprising a control system for controlling repositioning of the clamping surface between a clamping state and a release state of each primary clamping tong of the plurality of primary clamping tongs, wherein the control system comprises a first control input location located at a first location, and the control system comprises a second control input location located at a second location being separated from the first location by at least 5 meters.

34. The mould system according to claim 33, wherein the control system is configured to reposition the clamping surface to a clamping state of each primary clamping tong of the plurality of primary clamping tongs, upon simultaneously receiving a clamping state input from the first control input location and the second control input location.

35. The mould system according to claim 33, wherein the control system is configured to reposition the clamping surface to a release state of each primary clamping tong of the plurality of primary clamping tongs, upon simultaneously receiving a release state input from the first control input location and the second control input location.

36. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment; and a third tong segment extending from a third primary end to a third secondary end, the third tong segment being attached at the third primary end to the second secondary end of the second tong segment, the third tong segment having a clamping surface for applying a clamping force on a mould section, wherein the clamping tong is configured to reposition the clamping surface between a clamping state and a release state, wherein the distance between the clamping surface and the first tong axis in the clamping state is shorter than the distance between the clamping surface and the first tong axis in the release state, wherein the first tong segment is attachable to the mould, wherein the clamping tong comprises a locking mechanism for positioning and/or locking the clamping surface in the clamping state, wherein the locking mechanism comprises a knee joint element extending from a first knee joint end to a second knee joint end, wherein the knee joint element comprises a first knee joint part having the first knee joint end and a second knee joint part having the second knee joint end, the first knee joint part and the second knee joint part being hingedly connected at a knee joint coupling point to allow relative rotation between the first knee joint part and the second knee joint part about a knee joint axis, the knee joint element having a knee joint length from the first knee joint end to the second knee joint end, wherein the knee joint element is adjustable between a first knee joint state and a second knee joint state, wherein in the first knee joint state the knee joint length being a first knee joint length, and wherein in the second knee joint state the knee joint length being a second knee joint length, the second knee joint length being longer than the first knee joint length, wherein in an intermediate knee joint state between the first knee joint state and the second knee joint state the knee joint length being a maximum knee joint length, the maximum knee joint length being longer than the first knee joint length and the second knee joint length, and wherein the knee joint element is coupled to the clamping surface such that the clamping surface is in the clamping state when the knee joint element is in the second knee joint state and the clamping surface is in the release state when the knee joint element is in the first knee joint state.

37. The clamping tong according to claim 36, wherein the locking mechanism comprises a spring element providing a spring force to the second knee joint end towards the first knee joint end.

38. The clamping tong according to claim 37, wherein the spring element is composed of a plurality of disc springs.

39. The clamping tong according to claim 36, wherein the first fastening actuator end is attached to the knee joint coupling point, such that the fastening actuator is configured to position the knee joint element in the second knee joint state by attaining the extended fastening actuator state, and such that the fastening actuator is configured to position the knee joint element in the first knee joint state by attaining the retracted fastening actuator state.

40. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment, wherein the second tong segment is rotatable about the first tong axis or an axis parallel to the first tong axis;

a third tong segment extending from a third primary end to a third secondary end, the third tong segment being attached at the third primary end to the second secondary end of the second tong segment, the third tong segment having a clamping surface configured for applying a clamping force on a mould section; and a locking mechanism for positioning and/or locking the clamping surface in the clamping state, wherein the locking mechanism comprises a fastening actuator having a first fastening actuator end and a second fastening actuator end, wherein the fastening actuator in a retracted fastening actuator state has a retracted length between the first fastening actuator end and the second fastening actuator end, wherein the fastening actuator in an extended fastening actuator state has an extended length between the first fastening actuator end and the second fastening actuator end, the extended length being longer than the retracted length, wherein the fastening actuator is configured to adjust the distance between the clamping surface and the first tong axis so as to position the clamping surface in a clamping state and/or a release state, and wherein the fastening actuator is configured to attain the extended fastening actuator state upon receipt of a first fastening actuator input, wherein the clamping tong is configured to reposition the clamping surface between the clamping state and the release state, wherein the distance between the clamping surface and the first tong axis in the clamping state is shorter than the distance between the clamping surface and the first tong axis in the release state, and wherein the first tong segment is fixedly attachable to the mould.

41. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment, wherein the second tong segment is rotatable about the first tong axis or an axis parallel to the first tong axis;

a third tong segment extending from a third primary end to a third secondary end, the third tong segment being attached at the third primary end to the second secondary end of the second tong segment, the third tong segment having a clamping surface configured for applying a clamping force on a mould section; and a locking mechanism for positioning and/or locking the clamping surface in the clamping state, wherein the locking mechanism comprises a fastening actuator having a first fastening actuator end and a second fastening actuator end, wherein the fastening actuator in a retracted fastening actuator state has a retracted length between the first fastening actuator end and the second fastening actuator end, wherein the fastening actuator in an extended fastening actuator state has an extended length between the first fastening actuator end and the second fastening actuator end, the extended length being longer than the retracted length, wherein the fastening actuator is configured to adjust the distance between the clamping surface and the first tong axis so as to position the clamping surface in a clamping state and/or a release state, and wherein the fastening actuator is configured to attain the retracted fastening actuator state upon receipt of a second fastening actuator input, wherein the clamping tong is configured to reposition the clamping surface between the clamping state and the release state, wherein the distance between the clamping surface and the first tong axis in the clamping state is shorter than the distance between the clamping surface and the first tong axis in the release state, and wherein the first tong segment is fixedly attachable to the mould.

42. A clamping tong for securing a shell part of a wind turbine blade in a mould for moulding the shell part, the clamping tong comprising:

a first tong segment extending along a first tong axis from a first primary end to a first secondary end, wherein the first tong segment is adjustable along the first tong axis between a first retracted state and a first extended state, wherein in the first retracted state the first tong segment has a first retracted length between the first primary end and the first secondary end, and in the first extended state the first tong segment has a first extended length between the first primary end and the first secondary end, the first extended length being longer than the first retracted length;

a second tong segment extending along a second tong axis from a second primary end to a second secondary end, the second tong segment being attached at the second primary end to the first secondary end of the first tong segment, wherein the second tong segment is rotatable about the first tong axis or an axis parallel to the first tong axis;

a third tong segment extending from a third primary end to a third secondary end, the third tong segment being attached at the third primary end to the second secondary end of the second tong segment, the third tong segment having a clamping surface configured for applying a clamping force on a mould section; and a locking mechanism for positioning and/or locking the clamping surface in the clamping state, wherein the locking mechanism comprises a first locking arm being rotatable about a pivot axis, the first locking arm acting on the clamping surface about the pivot axis to translate movement of a movement point of the first locking arm along the second tong axis to an opposite movement of the clamping surface along the second tong axis, wherein the locking mechanism comprises a knee joint element extending from a first knee joint end to a second knee joint end, wherein the knee joint element comprises a first knee joint part having the first knee joint end and a second knee joint part having the second knee joint end, the first knee joint part and the second knee joint part being hingedly connected at a knee joint coupling point to allow relative rotation between the first knee joint part and the second knee joint part about a knee joint axis, the knee joint element having a knee joint length from the first knee joint end to the second knee joint end, wherein the knee joint element is adjustable between a first knee joint state and a second knee joint state, wherein in the first knee joint state the knee joint length being a first knee joint length, and wherein in the second knee joint state the knee joint length being a second knee joint length, the second knee joint length being longer than the first knee joint length, wherein, in an intermediate knee joint state between the first knee joint state and the second knee joint state, the knee joint length is a maximum knee joint length, the maximum knee joint length being longer than the first knee joint length and the second knee joint length, wherein the knee joint element is coupled to the clamping surface such that the clamping surface is in a clamping state when the knee joint element is in the second knee joint state and the clamping surface is in a release state when the knee joint element is in the first knee joint state, wherein the first knee joint end of the knee joint element is connected to the movement point of the first locking arm, wherein the clamping tong is configured to reposition the clamping surface between the clamping state and the release state, wherein the distance between the clamping surface and the first tong axis in the clamping state is shorter than the distance between the clamping surface and the first tong axis in the release state, and wherein the first tong segment is fixedly attachable to the mould.

\* \* \* \* \*